US012621731B2

(12) United States Patent
Gao et al.

(10) Patent No.: US 12,621,731 B2
(45) Date of Patent: May 5, 2026

(54) SLICE INFORMATION FOR CELL SELECTION OR CELL RESELECTION

(71) Applicant: ZTE Corporation, Shenzhen (CN)

(72) Inventors: Yuan Gao, Shenzhen (CN); He Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 268 days.

(21) Appl. No.: 18/522,620

(22) Filed: Nov. 29, 2023

(65) Prior Publication Data

US 2024/0172063 A1     May 23, 2024

Related U.S. Application Data

(63) Continuation of application No. PCT/CN2021/112382, filed on Aug. 13, 2021.

(51) Int. Cl.

| | |
|---|---|
| *H04W 36/08* | (2009.01) |
| *H04W 36/00* | (2009.01) |
| *H04W 36/12* | (2009.01) |
| *H04W 36/14* | (2009.01) |
| *H04W 36/18* | (2009.01) |
| *H04W 36/20* | (2009.01) |

(52) U.S. Cl.
CPC ..... *H04W 36/00835* (2018.08); *H04W 36/08* (2013.01)

(58) Field of Classification Search
CPC ....... H04W 36/00835; H04W 36/0055; H04W 36/12; H04W 48/20; H04W 36/04; H04W 36/08; H04W 48/08; H04W 48/18

USPC ......................................................... 455/436
See application file for complete search history.

(56) References Cited

U.S. PATENT DOCUMENTS

| | | | |
|---|---|---|---|
| 10,966,128 B2 | 3/2021 | Zee et al. | |
| 2019/0174406 A1* | 6/2019 | Hwang ................. | H04W 36/08 |
| 2019/0373523 A1 | 12/2019 | Panchal et al. | |
| 2023/0030150 A1* | 2/2023 | Shih ...................... | H04W 76/30 |
| 2024/0121710 A1* | 4/2024 | Cheng ................... | H04W 48/20 |

FOREIGN PATENT DOCUMENTS

| | | |
|---|---|---|
| CN | 108566309 A | 9/2018 |
| CN | 111149387 A | 5/2020 |
| CN | 111866991 A | 10/2020 |
| WO | 2021146852 A1 | 7/2021 |
| WO | 2023015538 A1 | 2/2023 |

OTHER PUBLICATIONS

IP.com search History (Year: 2025).*

(Continued)

*Primary Examiner* — Moustapha Diaby
(74) *Attorney, Agent, or Firm* — Perkins Coie LLP

(57) ABSTRACT

Techniques are described to perform cell selection operation or cell reselection operation by using slice information. An example wireless communication method includes receiving, by a communication device, a slice information that indicates a configuration associated with one or more slices; and performing, by the communication device, a cell selection operation or a cell re-selection operation with a target cell that is determined by the communication device using the slice information.

28 Claims, 7 Drawing Sheets

Receiving, by a communication device, a slice information that indicates a configuration associated with one or more slices

102

Performing, by the communication device, a cell selection operation or a cell re-selection operation with a target cell that is determined by the communication device using the slice information

104

(56) References Cited

OTHER PUBLICATIONS

CNIPA, Second Office Action for Chinese Application No. 202410356116.2, mailed on Dec. 28, 2024, 20 pages with unofficial English translation.

EPO, Extended European Search Report for European Application No. 21 953 155.5, mailed on Dec. 3, 2024, 14 pages.

ZTE Corporation et al., "Discussion on slice-aware cell reselection," 3GPP TSG RAN WG2 #115-e, R2-2107730, Electronic, Aug. 9-27, 2021, 10 pages.

Lenovo et al., "Comparison of Solution Options," 3GPP TSG-RAN WG2 Meeting #115-e, R2-2108025, E-Meeting, Aug. 9-27, 2021, 78 pages.

Huawei et al., "Slice based Cell (re)selection under network control," 3GPP TSG-RAN WG2 Meeting #113 electronic, R2-2101699, Online, Jan. 25-Feb. 5, 2021, 13 pages.

CNIPA, First Office Action for Chinese Application No. 202410356116.2, mailed on Sep. 6, 2024, 19 pages with unofficial English translation.

Lenovo et al., "Summary of [AT114-e][250][Slicing] Usage of slice priorities for cell," 3GPP TSG RAN WG2 #114-e, E-Meeting, R2-2106501, May 19-27, 2021, 31 pages.

Vivo, "Discussion on slice-based cell reselection," 3GPP TSG RAN WG2 #114-e, E-Meeting, R2-2105331, Apr. 19-28, 2021, 4 pages.

Spreadtrum Communications, "Cell Reselection Based on Slice Information," 3GPP TSG RAN WG2 #99, Berlin, Germany, R2-1707978, Apr. 21-25, 2017, 3 pages.

International Search Report for International Application No. PCT/CN2021/112382, Mail Date: Mar. 4, 2022. 10 pages.

CNIPA, Rejection Decision for Chinese Application No. 202410356116.2, mailed on May 12, 2025, 19 pages with unofficial English translation.

EPO, Communication pursuant to Article 94(3) EPC for European Application No. 21 953 155.5, mailed on Sep. 17, 2025, 9 pages.

EPO, Communication pursuant to Article 94(3) EPC for European Application No. 21 953 155.5, mailed on Mar. 3, 2026, 4 pages.

* cited by examiner

102

Receiving, by a communication device, a slice information that indicates a configuration associated with one or more slices

104

Performing, by the communication device, a cell selection operation or a cell re-selection operation with a target cell that is determined by the communication device using the slice information

Figure 2A:
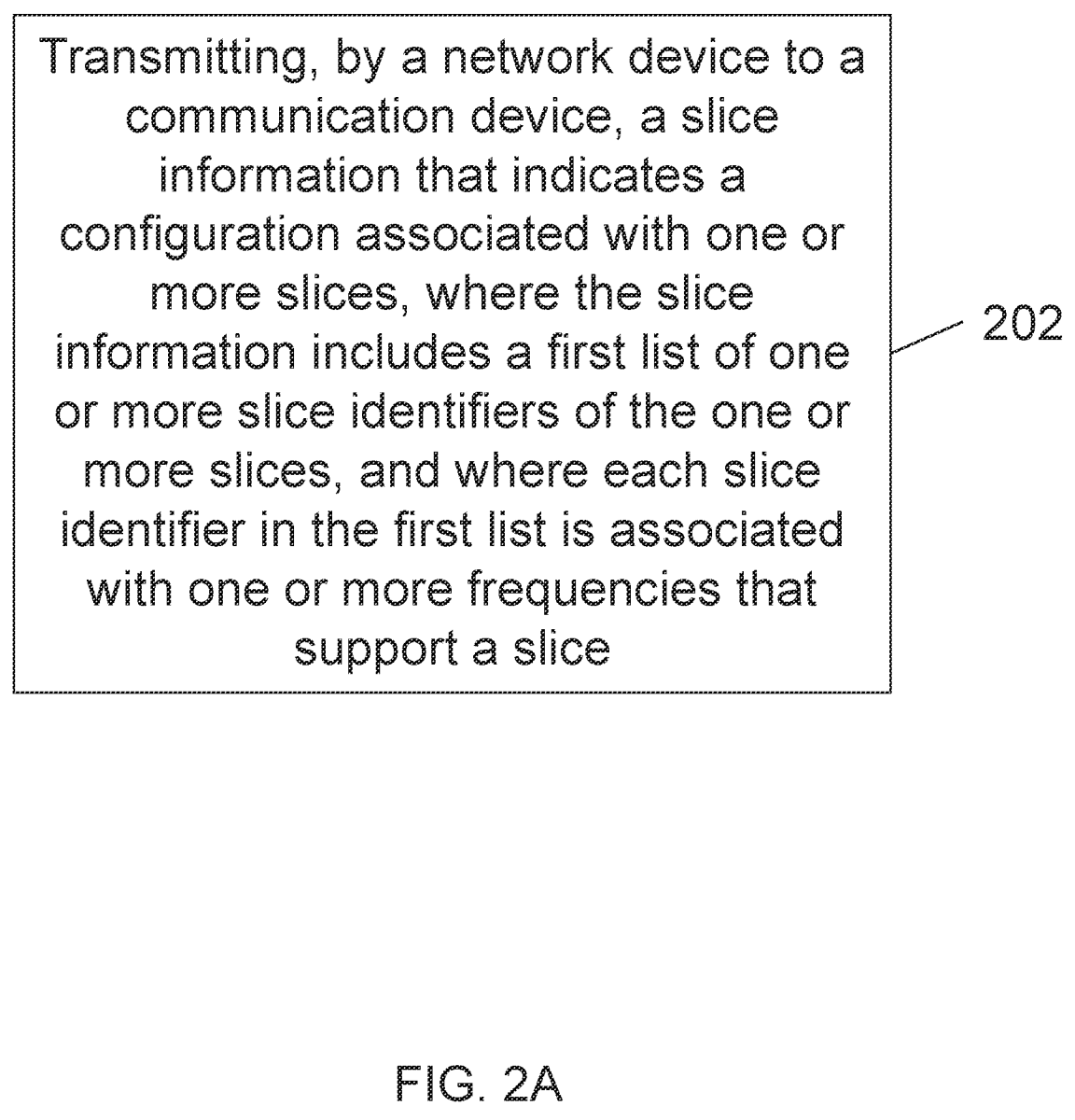

202

Transmitting, by a network device to a communication device, a slice information that indicates a configuration associated with one or more slices, where the slice information includes a first list of one or more slice identifiers of the one or more slices, and where each slice identifier in the first list is associated with one or more frequencies that support a slice

Transmitting, by a network device to a communication device, a slice information that indicates a configuration associated with one or more slices, where the slice information includes a second list of one or more slice group identifiers, where each slice group identifier in the second list is associated with one or more frequencies that support a slice group, and where each slice group indicated by the second list is associated with at least one slice

Transmitting, by a network device to a communication device, a slice information that indicates a configuration associated with one or more slices, where the slice information includes a third list of one or more access category identifiers associated with the one or more slices, and where each access category identifier in the third list is associated with one or more frequencies that support an access category

Transmitting, by a network device to a communication device, a slice information that indicates a configuration associated with one or more slices, where the slice information includes: a serving frequency operated by the network device, and one or more other frequencies associated with the network device or each of one or more other network devices

| Memory | Processor(s) |
|--------|--------------|
| 405 | 410 |
| Transmitter | Receiver |
| 415 | 420 |

SLICE INFORMATION FOR CELL SELECTION OR CELL RESELECTION

CROSS REFERENCE TO RELATED APPLICATIONS

This patent document is a continuation of and claims benefit of priority to International Patent Application No. PCT/CN2021/112382, filed on Aug. 13, 2021. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for indicating to a communication device (e.g., user equipment (UE)) slice information with which the communication device can perform cell selection operation or cell reselection operation.

A first example wireless communication method comprises receiving, by a communication device, a slice information that indicates a configuration associated with one or more slices; and performing, by the communication device, a cell selection operation or a cell re-selection operation with a target cell that is determined by the communication device using the slice information. In some embodiments, the slice information includes a first list of one or more slice identifiers of the one or more slices, and each slice identifier in the first list is associated with one or more frequencies that support a slice. In some embodiments, the slice information includes a second list of one or more slice group identifiers, each slice group identifier in the second list is associated with one or more frequencies that support a slice group, and each slice group indicated by the second list is associated with at least one slice. In some embodiments, the slice information includes a third list of one or more access category identifiers associated with the one or more slices, and each slice identifier in the third list is associated with one or more frequencies that support an access category.

In some embodiments, the slice information includes: a serving frequency operated by the network device and one or more other frequencies associated with the network device or each of one or more other network devices. In some embodiments, the slice information includes, for the serving frequency and for each of the one or more frequencies, a first list of one or more slice identifiers of the one or more slices. In some embodiments, the slice information includes, for the serving frequency and for each of the one or more frequencies, a second list of one or more slice group identifiers, and each slice group indicated by the second list is associated with at least one slice. In some embodiments, the slice information includes, for the serving frequency and for each of the one or more frequencies, a third list of one or more access category identifiers associated with the one or more slices. In some embodiments, the slice information includes one or more reselection priority values, and each slice identifier in the first list or each slice group identifier in the second list or each access category identifier in the third list is associated with one reselection priority value for a frequency.

In some embodiments, the communication device performs the cell re-selection operation by determining a plurality of reselection priority values of a plurality of frequencies and by determining the target cell associated with one frequency from the plurality of frequencies. In some embodiments, the plurality of reselection priority values of the plurality of frequencies is determined according to a set of reselection priority values associated with the one or more slices, or one or more slice groups, or the one or more access categories. In some embodiments, the plurality of reselection priority values of the plurality of frequency is determined according to a number of the one or more slices, or a number of the one or more slice groups, or a number of the one or more access categories supported in each frequency. In some embodiments, the communication device performs the cell selection operation or the cell re-selection operation by determining that the target cell is a highest ranked cell from a plurality of cells. In some embodiments, the communication device ranks the plurality of cells in an order based on a cell ranking criterion upon determining that the plurality of cells are associated with a same frequency.

In some embodiments, the communication device ranks the plurality of cells in an order based on a cell ranking criterion upon determining that one frequency from one cell from the plurality of cells is associated with a same reselection priority value as another frequency from another cell from the plurality of cells. In some embodiments, the plurality of cells are associated with at least one frequency that satisfies a cell selection criterion. In some embodiments, the plurality of cells are from a fourth list of cells indicated in the slice information, and the plurality of cells satisfy a cell selection criterion.

A second example wireless communication method comprises transmitting, by a network device to a communication device, a slice information that indicates a configuration associated with one or more slices, where the slice information includes a first list of one or more slice identifiers of the one or more slices, and where each slice identifier in the first list is associated with one or more frequencies that support a slice.

A third example wireless communication method comprises transmitting, by a network device to a communication device, a slice information that indicates a configuration associated with one or more slices, where the slice information includes a second list of one or more slice group identifiers, where each slice group identifier in the second list is associated with one or more frequencies that support a slice group, and where each slice group indicated by the second list is associated with at least one slice.

A third example wireless communication method comprises transmitting, by a network device to a communication device, a slice information that indicates a configuration associated with one or more slices, where the slice information includes a third list of one or more access category identifiers associated with the one or more slices, and where each access category identifier in the third list is associated with one or more frequencies that support an access category.

A fourth example wireless communication method comprises transmitting, by a network device to a communication device, a slice information that indicates a configuration associated with one or more slices, where the slice information includes: a serving frequency operated by the network device, and one or more other frequencies associated with the network device or each of one or more other network devices.

In some embodiments, the slice information includes, for the serving frequency and for each of the one or more frequencies, a first list of one or more slice identifiers of the one or more slices. In some embodiments, the slice information includes, for the serving frequency and for each of the one or more frequencies, a second list of one or more slice group identifiers, and each slice group indicated by the second list is associated with at least one slice. In some embodiments, the slice information includes, for the serving frequency and for each of the one or more frequencies, a third list of one or more access category identifiers associated with the one or more slices. In some embodiments, the slice information includes one or more reselection priority values, and each slice identifier in the first list or each slice group identifier in the second list or each access category identifier in the third list is associated with one reselection priority value for a frequency.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWING

FIGS. 2A-2C and 3 show exemplary flowcharts for indicating slice information.

DETAILED DESCRIPTION

Figure 1:
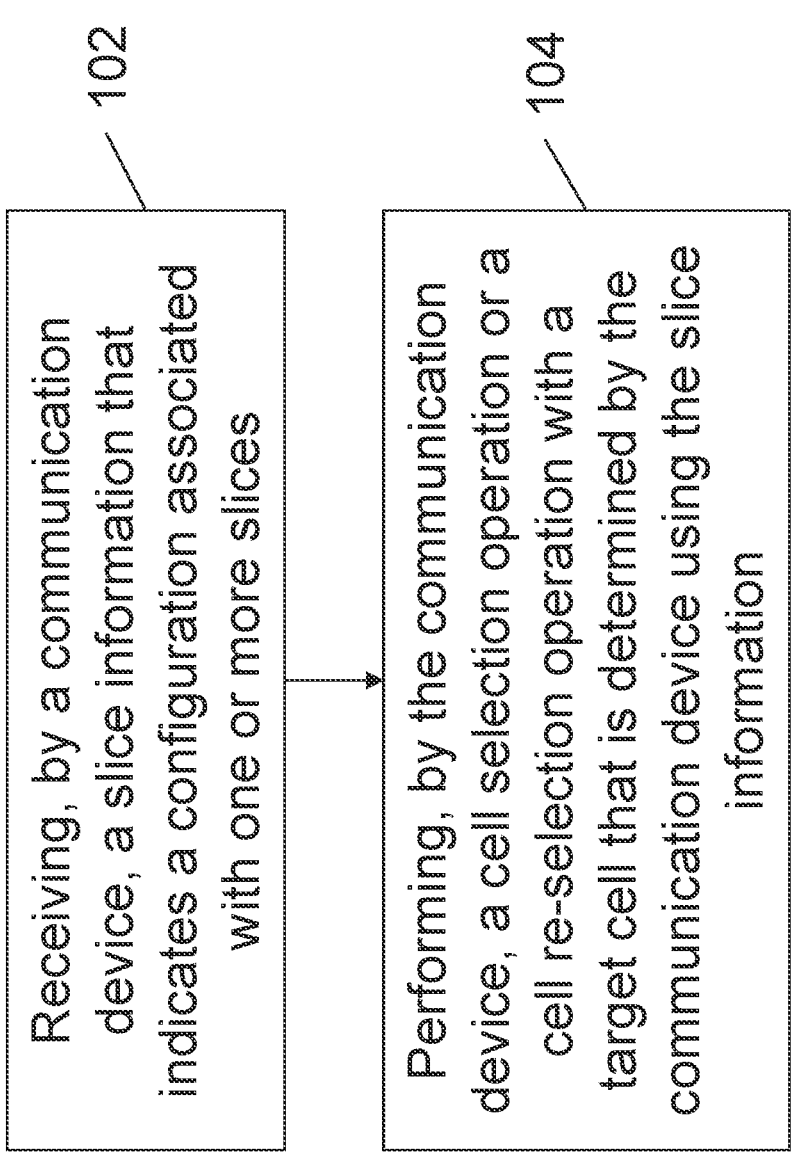
FIG. 1 shows an exemplary flowchart for indicating slice information for a cell selection operation or a cell reselection operation.

Network Slicing has been introduced in New Radio (NR), and Evolved Universal Terrestrial Radio Access (EUTRA) connected to 5GC, which is a concept to allow differentiated treatment depending on each customer requirements. With slicing, it is possible for Mobile Network Operators (MNO) to consider customers as belonging to different tenant types with each having different service requirements that govern in terms of what slice types each tenant is eligible to use based on Service Level Agreement (SLA) and subscriptions. To allow user equipment (UE) to take the slice availability at network side into consideration, the slice information, including the slices supported by the network (e.g., base station) and some configuration applicable for certain slices, can be transmitted from network to UE. The UE can then use such information to select or reselect a cell supporting one or more slices, via which it may initiate service. Thus, this patent document describes techniques for a network to transmit to the UE the slice information, including the slices supported by the network and some configuration applicable for certain slices. This patent document also describes utilization of the slice information at UE side for cell selection and reselection.

In an example embodiment, a UE receive the slice information from network side (e.g., base station) and use such slice information to decide the target cell for selection or reselection using the following two steps:

In a first step, the UE receive slice information from network side (e.g., from a serving cell of a base station on which the UE is camping).

In a second step, the UE uses the slice information to decide the target cell for selection and reselection. The target cell may be associated with the base station that transmitted the slice information in the first step or the target cell may be associated with another base station.

The example techniques are explained using "item" numbers, "option" numbers and "example" numbers to facilitate the understanding of the disclosed subject matter and do not limit the scope of the claimed subject matter in any way. Accordingly, one or more features of one item/option/ example can be combined with one or more features of another item/option/example.

Item 1: In the first step, the slice information further compromise:

Option 1: A list of slices or slice groups or access categories associated with slices supported by the serving frequency of the serving cell and the neighbor frequencies of one or more other cells. An example of the slice information indicated as part of Option 1 is shown in the example Table 1 below.

A list of slice/slice group/access category associated with slices can be indicated in any one or more of the following way:

Explicit indication via the slice identity.

Implicit indication with the absence of the frequency information for a certain slice/slice group/access category associated with slices, where the absence of frequency information shows a lack of support for the certain slice/slice group/access category associated with slices.

A bitmap with each bit refers to a slice/slice group/ access category and value "1" indicates that this slice/slice group/access category is supported.

The neighbor frequencies may include NR frequencies and/or EUTRA frequencies.

For each slice or slice group or access category associated with slice(s), a list of frequencies supporting this slice or slice group or access category associated with slice(s) is included.

For each frequency in the list, a reselection priority value and or a list of cells (identified by PCI) with or without some cell specific configuration (e.g. q-OffsetCell/q-RxLevMinOffsetCell/q-RxLevMinOffsetCellSUL/q-QualMinOffsetCell/ssb-PositionQCL) can be included.

The frequency can be indicated in any one or more of the following ways:

Explicitly identified by a frequency index or ARFCN value.

If the frequency index is used, value 0 refers to the serving frequency, value 1 refers to the first frequency in InterFreqCarrierFreqList in SIB4 or the first frequency in CarrierFreqListEUTRA in SIB5, value 2 refers to the second frequency and so on.

If the ARFCN is used, it can be ARFCN-ValueEUTRA or ARFCN-ValueNR.

Implicit indication with the absence of the slice information per frequency showing that the corresponding frequency does not support the slice lice/slice group/access category associated with slices.

In some embodiments, the priority values or the reselection priority values of the frequencies within one slice Id or within one slice group Id may be the same. In some embodiments, the priority value or the reselection priority value of a frequency within one slice Id or within one slice group Id may be the same as the priority value or the reselection priority value of a frequency within another slice Id or within another slice group Id.

TABLE 1

| Slice Information | | | |
|---|---|---|---|
| Slice Id-1/ Slice-Group Id-1 | Supported-on-Freq-x Supported-on-Freq-y | Freq-x-priority (Optional) Freq-y-priority (Optional) | Physical cell identity (PCI) list (Optional) PCI list (Optional) |

TABLE 1-continued

| Slice Information | | | |
|---|---|---|---|
| Slice Id-2/ Slice-Group Id-2 | Supported-on-Freq-x Supported-on-Freq-z | Freq-x-priority (Optional) Freq-z-priority (Optional) | PCI list (Optional) PCI list (Optional) |
| . . . | . . . | . . . | . . . |

The following combinations of different ways to indicate the list of slice/slice group/access category associated with slice and the frequencies supporting a slice/slice group/access category associated with slices can be supported.

Explicit indication of the slice id or the slice group id or the access category associated with slices+Explicit indication of the frequency.

Explicit indication of the slice id or the slice group id or the access category+Bitmap indicating the presence of each frequency.

Explicit indication of the slice id or the slice group id or the access category+Implicit indication of the frequency.

Implicit indication of the slice id/the slice group id/access category+Explicit indication of the frequency.

Implicit indication of the slice id/the slice group id/access category+Bitmap indicating the presence of each frequency.

Implicit indication of the slice id/the slice group id/access category+Implicit indication of the frequency.

Bitmap indicating presence of slice info for each slice/slice group/access category+Explicit indication of the frequency.

Bitmap indicating presence of slice info for each slice/slice group/access category+Bitmap indicating the presence of each frequency.

Bitmap indicating presence of slice info for each slice/slice group/access category+Implicit indication of the frequency.

ASN.1 examples is given below for some combinations. ASN.1 examples for Option 1 of Item 1 as shown below:

---

Example 1 of Option 1 of Item 1 - Explicit indication of the slice id or the slice group id or the access category + Explicit indication of the frequency.

---

```
SliceInfoList ::= SEQUENCE (SIZE (1..maxSlicesConfigured)) OF SliceInfo//Only slice/slice
group supported by a neighbor frequency is included in this list
SliceInfo ::=    SEQUENCE {
   sliceIdentityList   SEQUENCE (SIZE (1.. maxSlicesConfigured))SliceIdentity,//The
slice id or the slice group id or the access category associated with slice(s)
       freqInfoListNR   SEQUENCE (SIZE (1.. maxFreq+1)) OF
FrequencyInfoNR OPTIONAL, -- Need R //NR frequencies supporting the slices/slice groups
or access categories associated with slice in sliceIdentity
       freqInfoListEUTRA   SEQUENCE (SIZE (1.. maxFreq)) OF
FrequencyInfoEUTRA OPTIONAL -- Need R
}
FrequencyInfoNR::=   SEQUENCE {
freqIndexNR      INTEGER (0.. maxFreq),//Index 0 refers to the serving frequency
sliceCellListNR          SliceCellListNR
       OPTIONAL, -- Need R
       cellReselectionPriority CellReselectionPriority OPTIONAL, -- Need R
       cellReselectionSubPriority CellReselectionSubPriority OPTIONAL -- Need R
}
FrequencyInfoEUTRA::=   SEQUENCE {
freqIndexEUTRA   INTEGER (1.. maxEUTRA-Carrier),
sliceCellListEUTRA       SliceCellListEUTRA
       OPTIONAL, -- Need R
       cellReselectionPriority CellReselectionPriority OPTIONAL, -- Need R
       cellReselectionSubPriority CellReselectionSubPriority OPTIONAL -- Need R
}
SliceCellListNR ::=   SEQUENCE (SIZE (1..maxCellSlice)) OF SliceCellInfoNR
SliceCellInfoNR ::=   SEQUENCE {
```

-continued

```
Example 1 of Option 1 of Item 1 - Explicit indication of the slice id or the
slice group id or the access category + Explicit indication of the frequency.
────────────────────────────────────────────────────────────────────────
    physCellId         PhysCellId,
    q-OffsetCell       Q-OffsetRange,
    q-RxLevMinOffsetCell      INTEGER (1..8)       OPTIONAL, -- Need
R
    q-RxLevMinOffsetCellSUL      INTEGER (1..8)       OPTIONAL, --
Need R
q-QualMinOffsetCell   INTEGER (1..8)       OPTIONAL, -- Need R
ssb-PositionQCL-r16   SSB-PositionQCL-Relation-r16   OPTIONAL, --
Cond SharedSpectrum2
    ...
}
SliceCellListEUTRA ::=      SEQUENCE (SIZE (1..maxCellSlice)) OF SliceCellInfo
SliceCellInfoEUTRA ::=         SEQUENCE {
    physCellId         EUTRA-PhysCellId,
    dummy              EUTRA-Q-OffsetRange,
    q-RxLevMinOffsetCell      INTEGER (1..8)         OPTIONAL, -- Need
R
    q-QualMinOffsetCell      INTEGER (1..8)      OPTIONAL -- Need R
}
```

The maxSlicesConfigured refers to the maximum number of slice/slice groups/access categories associated with slices allowed to be broadcast in system information or provisioned via RRCRelease message.

The sliceIdentityList information element can include one or more slice ids, slice groups or access categories associated with slice(s). For the case when more than slice ids, slice groups or access categories associated with slice(s) is included, all of them are supported by the frequencies in the freqInfoListNR and/or freqInfoListEUTRA and the associated cell reselection priority and sub-priority applies to all of them.

The sliceCellList include cells supporting the slice(s)/ slice group(s)/access category (or access categories) associated with slice(s) identified by sliceIdentityList. The maxCellSlice refers to the maximum number of cells for a slice/slice group/access category that can be provided.

```
Example 2 of Option 1 of Item 1 - Implicit indication of the slice id/the
slice group id/access category + Explicit indication of the frequency
────────────────────────────────────────────────────────────────────────
SliceInfoList ::=   SEQUENCE (SIZE (maxSlicesDefined)) OF SliceInfo
SliceInfo ::=        SEQUENCE {
    frequency InfoList    Frequency InfoList
    OPTIONAL -- Need R
}
FrequencyInfoList ::=    SEQUENCE {
freqInfoListNR    SEQUENCE (SIZE (1.. maxFreq+1)) OF FrequencyInfoNR
OPTIONAL, -- Need R
    freqInfoListEUTRA    SEQUENCE (SIZE (1.. maxFreq)) OF
FrequencyInfoEUTRA    OPTIONAL -- Need R
}
FrequencyInfoNR ::=    SEQUENCE {
    freqIndexNR         INTEGER (0.. maxFreq),
    sliceCellListNR          SliceCellListNR
    OPTIONAL, -- Need R
    cellReselectionPriority CellReselectionPriority OPTIONAL, -- Need R
    cellReselectionSubPriority CellReselectionSubPriority OPTIONAL -- Need R
}
Frequency InfoEUTRA::=        SEQUENCE {
freqIndexEUTRA   INTEGER (1.. maxEUTRA-Carrier),
sliceCellListEUTRA       SliceCellListEUTRA
    OPTIONAL, -- Need R
    cellReselectionPriority CellReselectionPriority OPTIONAL, -- Need R
    cellReselectionSubPriority CellReselectionSubPriority OPTIONAL -- Need R
SliceCellListNR ::=   SEQUENCE (SIZE (1..maxCellSlice)) OF SliceCellInfoNR
SliceCellInfoNR ::=         SEQUENCE {
    physCellId         PhysCellId,
    q-OffsetCell       Q-OffsetRange,
    q-RxLevMinOffsetCell   INTEGER (1..8)         OPTIONAL, -- Need
R
    q-RxLevMinOffsetCellSUL   INTEGER (1..8)         OPTIONAL, --
Need R
q-QualMinOffsetCell   INTEGER (1..8)         OPTIONAL, -- Need R
ssb-PositionQCL-r16   SSB-PositionQCL-Relation-r16   OPTIONAL, --
Cond SharedSpectrum2
    ...
}
SliceCellListEUTRA ::=      SEQUENCE (SIZE (1..maxCellSlice)) OF SliceCellInfo
```

-continued

---

Example 2 of Option 1 of Item 1 - Implicit indication of the slice id/the
slice group id/access category + Explicit indication of the frequency

---

```
SliceCellInfoEUTRA ::=        SEQUENCE {
  physCellId       EUTRA-PhysCellId,
  dummy          EUTRA-Q-OffsetRange,
  q-RxLevMinOffsetCell      INTEGER (1..8)        OPTIONAL, -- Need
R
  q-QualMinOffsetCell       INTEGER (1..8)        OPTIONAL -- Need R
}
```

---

The maxSlicesDefined refers to the maximum number of slice/slice groups defined via NAS/AS signaling. The first item in the SliceInfoList refers to the slice/slice group/access category associated with slices with sliceIdentity 0, the second item in this list refer to the slice/slice group/access category associated with slices with sliceIdentity 1 and so on.

The absence of frequencyInfoList in SliceInfo indicates that the corresponding the slice/slice group/access category associated with slices is not supported in the serving and neighbor frequencies.

refers to the slice/slice group/access category associated with slices with sliceIdentity 0, the second bit refer to the slice/slice group/access category associated with slices with sliceIdentity 1 and so on with value "0" indicates that the slice/slice group/access category associated with slices is not supported by the serving and neighbor frequencies.

SliceInfoList only include the slice/slice group/access category associated with slices supported by the serving and neighbor frequencies. The first item in this list refer to the first the slice/slice group/access category associated with

---

Example 3 of Option 1 of Item 1 - Bitmap indicating presence of slice info for
each slice/slice group/access category + Explicit indication of the frequency

---

```
SliceInfoPresenceBitmap BIT STRING (SIZE (maxSlicesDefined))
SliceInfoList ::= SEQUENCE (SIZE (1..maxSlicesConfigured)) OF SliceInfo
SliceInfo ::=    SEQUENCE {
freqInfoListNR     SEQUENCE (SIZE (1.. maxFreq+1)) OF FrequencyInfoNR
OPTIONAL, -- Need R
    freqInfoListEUTRA   SEQUENCE (SIZE (1.. maxFreq)) OF
FrequencyInfoEUTRA   OPTIONAL -- Need R
}
FrequencyInfoNR ::=   SEQUENCE {
    freqIndexNR   INTEGER (0.. maxFreq),
    sliceCellListNR      SliceCellListNR
      OPTIONAL, -- Need R
    cellReselectionPriority CellReselectionPriority OPTIONAL, -- Need R
    cellReselectionSubPriority CellReselectionSubPriority OPTIONAL -- Need R
}
FrequencyInfoEUTRA::=   SEQUENCE {
freqIndexEUTRA   INTEGER (1.. maxEUTRA-Carrier),
sliceCellListEUTRA      SliceCellListEUTRA
      OPTIONAL, -- Need R
    cellReselectionPriority CellReselectionPriority OPTIONAL, -- Need R
    cellReselectionSubPriority CellReselectionSubPriority OPTIONAL -- Need R
SliceCellListNR ::=   SEQUENCE (SIZE (1 .. maxCellSlice)) OF SliceCellInfoNR
SliceCellInfoNR ::=   SEQUENCE {
  physCellId        PhysCellId,
  q-OffsetCell      Q-OffsetRange,
  q-RxLevMinOffsetCell      INTEGER (1..8)        OPTIONAL, -- Need
R
  q-RxLevMinOffsetCellSUL      INTEGER (1..8)         OPTIONAL, --
Need R
q-QualMinOffsetCell      INTEGER (1..8)        OPTIONAL, -- Need R
ssb-PositionQCL-r16      SSB-PositionQCL-Relation-r16      OPTIONAL, --
Cond SharedSpectrum2
  ...
}
SliceCellListEUTRA ::=        SEQUENCE (SIZE (1..maxCellSlice)) OF SliceCellInfo
SliceCellInfoEUTRA ::=        SEQUENCE {
  physCellId       EUTRA-PhysCellId,
  dummy          EUTRA-Q-OffsetRange,
  q-RxLevMinOffsetCell      INTEGER (1..8)        OPTIONAL, -- Need
R
  q-QualMinOffsetCell       INTEGER (1..8)        OPTIONAL -- Need R
}
```

---

The size of the SliceInfoPresenceBitmap "maxSlicesConfigured" refers to the maximum number of slice/slice groups defined via NAS/AS signaling. The first bit in this bitmap slices supported by the serving and neighbor frequencies, which is the first slice with the corresponding bit in the SliceInfoPresenceBitmap with value "1".

Example 4 of Option 1 of Item 1 - Explicit indication of the slice id or the slice group id or the access category + Bitmap indicating the presence of each frequency

```
SliceInfoList ::=    SEQUENCE (SIZE (1..maxSlicesConfigured)) OF SliceInfo
SliceInfo ::=        SEQUENCE {
  sliceIdentityList   SEQUENCE (SIZE (1..maxSlicesConfigured))SliceIdentity,
     freqInfoListNR        SEQUENCE (SIZE (1..maxFreq+1)) OF FrequencyInfoNR
OPTIONAL, -- Need R
     freqInfoListEUTRA        SEQUENCE (SIZE (1.. maxEUTRA-Carrier)) OF
FrequencyInfoEUTRA   OPTIONAL -- Need R
     frequencyInfoPresenceBitmapNR BIT STRING (SIZE (maxFreq+1))
         OPTIONAL -- Need R//The first bit refers to the serving frequency
frequencyInfoPresenceBitmapEUTRA BIT STRING (SIZE (maxEUTRA-Carrier))
         OPTIONAL -- Need R
}
FrequencyInfoNR ::=  SEQUENCE {
     cellReselectionPriority CellReselectionPriority OPTIONAL, -- Need R
     cellReselectionSubPriority CellReselectionSubPriority OPTIONAL -- Need R
     sliceCellListNR              SliceCellListNR
        OPTIONAL, -- Need R
}
FrequencyInfoEUTRA ::=   SEQUENCE
     cellReselectionPriority CellReselectionPriority OPTIONAL, -- Need R
     cellReselectionSubPriority CellReselectionSubPriority OPTIONAL -- Need R
     sliceCellListEUTRA           SliceCellListEUTRA
        OPTIONAL, -- Need R
}
```

The first bit in the frequency InfoPresenceBitmapNR refers to the serving frequency, the second bit refers to the first frequency in InterFreqCarrierFreqList in SIB4, the third bit refers to the second frequency in InterFreqCarrierFreqList in SIB4 and so on. Value "1" indicates that the corresponding frequency supports the slices/slice groups/ access categories associated with slices identified in sliceIdentityList. The first item in freqInfoListNR refers to the first frequency supporting the slices/slice groups/access categories associated with slices identified in sliceIdentityList, for which the corresponding bit in frequency InfoPresenceBitmapNR is set to "1".

The first bit in the frequency InfoPresenceBitmapEUTRA refers to the first frequency in CarrierFreqListEUTRA in SIB5, the second bit refers to the second frequency in CarrierFreqListEUTRA in SIB5 and so on. Value "1" indicates that the corresponding frequency supports the slices/ slice groups/access categories associated with slices identified in sliceIdentityList. The first item in freqInfoListEUTRA refers to the first frequency supporting the slices/slice groups/access categories associated with slices identified in sliceIdentityList, for which the corresponding bit in frequency InfoPresenceBitmapEUTRA is set to "1".

Example 5 of Option 1 of Item 1 - Explicit indication of the slice id or the slice group id or the access category + Implicit indication of the frequency

```
SliceInfoList ::=    SEQUENCE (SIZE (1..maxSlicesConfigured)) OF SliceInfo
SliceInfo ::=        SEQUENCE {
  sliceIdentityList   SEQUENCE (SIZE (1..maxSlicesConfigured))SliceIdentity,
  frequencyInfoListNR        SEQUENCE (SIZE (maxFreq+1)) OF
FrequencyInfoNR   OPTIONAL -- Need R//The first bit is for the serving frequency
     freqInfoListEUTRA        SEQUENCE (SIZE (maxEUTRA-Carrier)) OF
FrequencyInfoEUTRA   OPTIONAL -- Need R
}
Frequency InfoNR ::=    SEQUENCE {
     sliceInfoPerFreqNR         SliceInfoPerFreqNR         OPTIONAL -
- Need R
}
Frequency InfoEUTRA ::=   SEQUENCE {
     sliceInfoPerFreqEUTRA        SliceInfoPerFreqEUTRA
        OPTIONAL -- Need R
}
SliceInfoPerFreqNR ::=    SEQUENCE {
     cellReselectionPriority CellReselectionPriority OPTIONAL, -- Need R
     cellReselectionSubPriority CellReselectionSubPriority OPTIONAL -- Need R
     sliceCellListNR              SliceCellListNR
        OPTIONAL, -- Need R
}
SliceInfoPerFreqEUTRA ::=       SEQUENCE {
     cellReselectionPriority CellReselectionPriority OPTIONAL, -- Need R
     cellReselectionSubPriority CellReselectionSubPriority OPTIONAL -- Need R
     sliceCellListEUTRA           SliceCellListEUTRA
        OPTIONAL, -- Need R
}
```

The first item in frequencyInfoListNR refers to the serving frequency, the second item refers to the first frequency in InterFreqCarrierFreqList in SIB4, the third bit refers to the second frequency in InterFreqCarrierFreqList in SIB4 and so on. For each frequency in the frequency InfoListNR, absence of the sliceInfoPerFreqNR indicates that the slices/slice groups/access categories associated with slices identified in sliceIdentityList is not supported in this frequency.

The first item in frequencyInfoListEUTRA refers to the first frequency in CarrierFreqListEUTRA in SIB5, the second bit refers to the second frequency in CarrierFreqListEUTRA in SIB5 and so on. For each frequency in the frequency InfoListEUTRA, absence of the sliceInfoPerFreqEUTRA indicates that the slices/slice groups/access categories associated with slices identified in sliceIdentityList is not supported in this frequency.

Item 1: In the first step, the slice information may include:

Option 2: Serving frequency of a serving cell and a list of neighbor frequencies of one or more other cells, where the slice information provided for each frequency can be as shown in the example Table 2 below.

The neighbor frequencies may include NR frequencies and/or EUTRA frequencies.

For each frequency, a list of slice/slice group/access category associated with slices supported by this frequency is provided. A reselection priority value and or a list of cells (identified by PCI) with or without some cell specific configuration (e.g. q-OffsetCell/q-RxLevMinOffsetCell/q-RxLevMinOffsetCellSUL/q-QualMinOffsetCell/ssb-PositionQCL) can be included for each slice/slice group/access category associated with slices, which are supported in this frequency.

A list of slice/slice group/access category associated with slices supported by the frequency can be indicated in any one or more of the following way:

Explicit indication via the slice identity.

Implicit indication with the absence of the frequency information for a certain slice/slice group/access category associated with slices showing this slice/slice group/access category associated with slices is not supported.

A bitmap with each bit refers to a slice/slice group/access category and value "1" indicates that this slice/slice group/access category is supported.

In some embodiments, the priority values or the reselection priority values of at least two slices for a particular frequency may be the same. In some embodiments, the priority values or the reselection priority values at least two slices between one frequency and another frequency may be the same.

TABLE 2

| Slice information | | | |
|---|---|---|---|
| For the serving frequency | | | |
| | Slice id-1/Slice Group Id-1 | Slice specific priority (Optional) | PCI list (Optional) |
| | Slice id-2/Slice Group Id-2 | Slice specific priority (Optional) | PCI list (Optional) |
| | . . . | . . . | . . . |
| For inter-frequency | | | |
| Frequency 1 | Slice id-1/Slice Group Id-1 | Slice specific priority (Optional) | PCI list (Optional) |
| | Slice id-2/Slice Group Id-2 | Slice specific priority (Optional) | PCI list (Optional) |
| | . . . | . . . | . . . |
| Frequency 2 | Slice id-1/Slice Group Id-1 | Slice specific priority (Optional) | PCI list (Optional) |
| | Slice id-2/Slice Group Id-2 | Slice specific priority (Optional) | PCI list (Optional) |
| | . . . | . . . | . . . |
| | | . . . | |

ASN.1 examples for Option 2 of Item 1 as shown below:

---

Example 1 of Option 2 of Item 1 - Explicit indication of the slice id or the slice group id or the access category supported by the frequency.

```
• SliceInfo-r17
SliceInfo-r17::= SEQUENCE {
        sliceIdentityList   SEQUENCE (SIZE (1..
maxSlicesConfigured))SliceIdentity,//The slice id or the slice group id or the access category
associated with slice(s)
        cellReselectionPriority CellReselectionPriority OPTIONAL, -- Need R
        cellReselectionSubPriority CellReselectionSubPriority OPTIONAL -- Need R
sliceCellListNR-r17          SliceCellListNR-r17
        OPTIONAL, -- Need R
sliceCellListEUTRA-r17          SliceCellListEUTRA-r17
        OPTIONAL -- Need R
}
SliceCellListNR-r17 ::=      SEQUENCE (SIZE (1. . maxCellSlice)) OF SliceCellInfoNR
SliceCellInfoNR-r17 ::=      SEQUENCE {
    physCellId          PhysCellId,
    q-OffsetCell        Q-OffsetRange,
    q-RxLevMinOffsetCell      INTEGER (1..8)      OPTIONAL, -- Need
R
    q-RxLevMinOffsetCellSUL      INTEGER (1..8)      OPTIONAL, --
Need R
q-QualMinOffsetCell      INTEGER (1..8)      OPTIONAL, -- Need R
ssb-PositionQCL-r16   SSB-PositionQCL-Relation-r16   OPTIONAL, --
Cond SharedSpectrum2
        ...
}
SliceCellListEUTRA-r17 ::=      SEQUENCE (SIZE (1..maxCellSlice)) OF SliceCellInfo
SliceCellInfoEUTRA-r17 ::=          SEQUENCE {
    physCellId          EUTRA-PhysCellId,
```

---

Example 1 of Option 2 of Item 1 - Explicit indication of the slice id or
the slice group id or the access category supported by the frequency.

---

```
    dummy           EUTRA-Q-OffsetRange,
    q-RxLevMinOffsetCell        INTEGER (1..8)       OPTIONAL, -- Need
R
    q-QualMinOffsetCell     INTEGER (1..8)       OPTIONAL -- Need R
}
    • SIB2
SIB2 ::=           SEQUENCE {
Partly omitted
    cellReselectionInfoCommon   SEQUENCE {
        nrofSS-BlocksToAverage       INTEGER (2 .. maxNrofSS-BlocksToAverage)
OPTIONAL,   -- Need S
        absThreshSS-BlocksConsolidation   ThresholdNR      OPTIONAL,
-- Need S
        rangeToBestCell       RangeToBestCell       OPTIONAL, --
Need R
        q-Hyst       ENUMERATED {
            dB0, dB1, dB2, dB3, dB4, dB5, dB6, dB8, dB10,
            dB12, dB14, dB16, dB18, dB20, dB22, dB24},
        speedStateReselectionPars   SEQUENCE {
            mobilityStateParameters   MobilityStateParameters,
            q-HystSF   SEQUENCE {
                sf-Medium   ENUMERATED {dB-6, dB-4, dB-2, dB0},
                sf-High   ENUMERATED {dB-6, dB-4, dB-2, dB0}
            }
        }               OPTIONAL, -- Need R
...,
[[
sliceInfoList-r17   SEQUENCE (SIZE (1..maxSlicesConfigured)) OF   SliceInfo-r17
OPTIONAL -- Need R
]]
}
    • SIB 4
SIB4 ::=       SEQUENCE {
    interFreqCarrierFreqList   InterFreqCarrierFreqList,
    lateNonCriticalExtension   OCTET STRING   OPTIONAL,
    ...,
    [[
    interFreqCarrierFreqList-v1610   InterFreqCarrierFreqList-v1610   OPTIONAL --
Need R
    ]]
}
InterFreqCarrierFreqList ::=   SEQUENCE (SIZE (1..maxFreq)) OF  InterFreqCarrierFreqInfo
InterFreqCarrierFreqList-v1610 ::= SEQUENCE (SIZE (1..maxFreq)) OF
InterFreqCarrierFreqInfo-v1610
InterFreqCarrierFreqInfo ::=   SEQUENCE {
Partly omitted
...,
[[
sliceInfoList-r17      SEQUENCE (SIZE (1..maxSlicesConfigured)) OF  SliceInfo-r17
OPTIONAL -- Need R
]]
}
    • SIB5
SIB5 ::=       SEQUENCE {
    carrierFreqListEUTRA      CarrierFreqListEUTRA      OPTIONAL, --
Need R
    t-ReselectionEUTRA       T-Reselection,
    t-ReselectionEUTRA-SF      SpeedStateScaleFactors      OPTIONAL, --
Need S
    lateNonCriticalExtension   OCTET STRING       OPTIONAL,
    ...,
    [[
    carrierFreqListEUTRA-v1610   CarrierFreqListEUTRA-v1610   OPTIONAL
-- Need R
    ]]
    [[
carrierFreqListEUTRA-v17xy   CarrierFreqListEUTRA-v17xy   OPTIONAL --
Need R
    ]]
}
CarrierFreqListEUTRA ::=       SEQUENCE (SIZE (1..maxEUTRA-Carrier)) OF
CarrierFreqEUTRA
CarrierFreqListEUTRA-v1610 ::=   SEQUENCE (SIZE (1..maxEUTRA-Carrier)) OF
CarrierFreqEUTRA-v1610
CarrierFreqListEUTRA-v17xy::=   SEQUENCE (SIZE (1..maxEUTRA-Carrier)) OF
CarrierFreqEUTRA-v17xy
```

-continued

---

Example 1 of Option 2 of Item 1 - Explicit indication of the slice id or
the slice group id or the access category supported by the frequency.

---

```
CarrierFreqEUTRA-v17xy ::= SEQUENCE {
    sliceInfoList-r17      SEQUENCE (SIZE (1..maxSlicesConfigured)) OF SliceInfo-r17
OPTIONAL -- Need R
}
    • RRCRelease
RRCRelease-v17xy-IEs ::=   SEQUENCE {
            sliceSpecificCellReselectionPriorities-r17   SliceSpecificCellReselectionPriorities-
r17             OPTIONAL -- Need R
    nonCriticalExtension   SEQUENCE { }          OPTIONAL
}
SliceSpecificCellReselectionPriorities-r17 ::=   SEQUENCE {
    sliceSpecificFreqPriorityListEUTRA-r17      SliceSpecificFreqPriorityListEUTRA-17
OPTIONAL, -- Need M
    sliceSpecificFreqPriorityListNR-r17      SliceSpecificFreqPriorityListNR-r17
OPTIONAL, -- Need M
}
SliceSpecificFreqPriorityListEUTRA-17::=      SEQUENCE (SIZE (1..maxFreq)) OF
SliceSpecificFreqPriorityEUTRA-r17
SliceSpecificFreqPriorityListNR-r17 ::=      SEQUENCE (SIZE (1..maxFreq)) OF
SliceSpecificFreqPriorityNR-r17
SliceSpecificFreqPriorityEUTRA-r17 ::=         SEQUENCE {
carrierFreq      ARFCN-ValueEUTRA,
sliceInfoList-r17      SEQUENCE (SIZE (1..maxSlicesConfigured)) OF SliceInfo-r17
OPTIONAL -- Need R
}
FreqPriorityNR ::=      SEQUENCE {
    carrierFreq      ARFCN-ValueNR,
sliceInfoList-r17      SEQUENCE (SIZE (1..maxSlicesConfigured)) OF SliceInfo-r17
OPTIONAL -- Need R
}
```

---

Example 2 of Option 2 of Item 1 - Implicit indication of the slice id
or the slice group id or the access category associated with slices

---

```
SliceInfo-r17
SliceInfo-r17 ::=         SEQUENCE {
            sliceSpecificPriority-r17   SliceSpecificPriority-r17   OPTIONAL --
Need R
}
SliceSpecificPriority-r17 ::=        SEQUENCE {
            cellReselectionPriority CellReselectionPriority OPTIONAL, -- Need R
            cellReselectionSubPriority CellReselectionSubPriority OPTIONAL -- Need R
sliceCellListNR-r17             SliceCellListNR-r17
            OPTIONAL, -- Need R
sliceCellListEUTRA-r17           SliceCellListEUTRA-r17
            OPTIONAL -- Need R
}
SIB2
SIB2 ::=            SEQUENCE {
Partly omitted
    cellReselectionInfoCommon      SEQUENCE {
        nrofSS-BlocksToAverage      INTEGER (2..maxNrofSS-BlocksToAverage)
OPTIONAL, -- Need S
        absThreshSS-BlocksConsolidation   ThresholdNR         OPTIONAL,
-- Need S
        rangeToBestCell         RangeToBestCell        OPTIONAL, --
Need R
    q-Hyst         ENUMERATED {
            dB0, dB1, dB2, dB3, dB4, dB5, dB6, dB8, dB10,
            dB12, dB14, dB16, dB18, dB20, dB22, dB24},
        speedStateReselectionPars   SEQUENCE {
        mobilityStateParameters   MobilityStateParameters,
        q-HystSF      SEQUENCE {
            sf-Medium   ENUMERATED {dB-6, dB-4, dB-2, dB0},
            sf-High   ENUMERATED {dB-6, dB-4, dB-2, dB0}
        }
    }                  OPTIONAL, -- Need R
...;
[[
sliceInfoList-R17      SEQUENCE (SIZE (maxSlicesDefined)) OF SliceInfo-r17
OPTIONAL -- Need R
]]
}
```

-continued

---

Example 2 of Option 2 of Item 1 - Implicit indication of the slice id
or the slice group id or the access category associated with slices

---

```
SIB 4
SIB4 ::=        SEQUENCE {
  interFreqCarrierFreqList      InterFreqCarrierFreqList,
  lateNonCriticalExtension      OCTET STRING        OPTIONAL,
  ...,
  [[
  interFreqCarrierFreqList-v1610   InterFreqCarrierFreqList-v1610   OPTIONAL --
Need R
  ]]
}
InterFreqCarrierFreqList ::=   SEQUENCE (SIZE (1..maxFreq)) OF InterFreqCarrierFreqInfo
InterFreqCarrierFreqList-v1610 ::= SEQUENCE (SIZE (1..maxFreq)) OF
InterFreqCarrierFreqInfo-v1610
InterFreqCarrierFreqInfo ::=   SEQUENCE {
Partly omitted
...,
[[
sliceInfoList-R17      SEQUENCE (SIZE (maxSlicesDefined)) OF SliceInfo-r17
OPTIONAL -- Need R
]]
}
SIB5
SIB5 ::=        SEQUENCE {
  carrierFreqListEUTRA      CarrierFreqListEUTRA      OPTIONAL, --
Need R
  t-ReselectionEUTRA       T-Reselection,
  t-ReselectionEUTRA-SF      SpeedStateScaleFactors        OPTIONAL, --
Need S
  lateNonCriticalExtension      OCTET STRING      OPTIONAL,
  ...,
  [[
  carrierFreqListEUTRA-v1610      CarrierFreqListEUTRA-v1610      OPTIONAL
-- Need R
]]
[[
carrierFreqListEUTRA-v17xy      CarrierFreqListEUTRA-v17xy      OPTIONAL --
Need R
]]
}
CarrierFreqListEUTRA ::=      SEQUENCE (SIZE (1..maxEUTRA-Carrier)) OF
CarrierFreqEUTRA
CarrierFreqListEUTRA-v1610 ::=   SEQUENCE (SIZE (1..maxEUTRA-Carrier)) OF
CarrierFreqEUTRA-v1610
CarrierFreqListEUTRA-v17xy ::=   SEQUENCE (SIZE (1..maxEUTRA-Carrier)) OF
CarrierFreqEUTRA-v17xy
CarrierFreqEUTRA-v17xy ::= SEQUENCE {
 sliceInfoList-R17      SEQUENCE (SIZE (maxSlicesDefined)) OF SliceInfo-r17
OPTIONAL -- Need R
}
RRCRelease
RRCRelease-v17xy-IEs ::=      SEQUENCE {
          sliceSpecificCellReselectionPriorities-r17   SliceSpecificCellReselectionPriorities-
r17            OPTIONAL -- Need R
   nonCriticalExtension   SEQUENCE { }      OPTIONAL
}
SliceSpecificCellReselectionPriorities-r17 ::=   SEQUENCE {
  sliceSpecificFreqPriorityListEUTRA-r17      SliceSpecificFreqPriorityListEUTRA-17
OPTIONAL, -- Need M
  sliceSpecificFreqPriorityListNR-r17   SliceSpecificFreqPriorityListNR-r17
OPTIONAL, -- Need M
}
SliceSpecificFreqPriorityListEUTRA-17::=      SEQUENCE (SIZE (1..maxFreq)) OF
SliceSpecificFreqPriorityEUTRA-r17
SliceSpecificFreqPriorityListNR-r17 ::=      SEQUENCE (SIZE (1..maxFreq)) OF
SliceSpecificFreqPriorityNR-r17
SliceSpecificFreqPriorityEUTRA-r17 ::=        SEQUENCE {
carrierFreq      ARFCN-ValueEUTRA,
sliceInfoList-R17      SEQUENCE (SIZE (maxSlicesDefined)) OF SliceInfo-r17
OPTIONAL -- Need R
}
FreqPriorityNR ::=        SEQUENCE {
  carrierFreq       ARFCN-ValueNR,
sliceInfoList-R17      SEQUENCE (SIZE (maxSlicesDefined)) OF SliceInfo-r17
OPTIONAL -- Need R
}
```

Example 3 of Option 2 of Item 1 - Bitmap indicating presence of slice or slice group.

```
SliceInfo-r17
SliceInfo-r17 ::=   SEQUENCE {
          cellReselectionPriority CellReselectionPriority OPTIONAL, -- Need R
          cellReselectionSubPriority CellReselectionSubPriority OPTIONAL, -- Need R
sliceCellListNR-r17              SliceCellListNR-r17
          OPTIONAL, -- Need R
          sliceCellListEUTRA-r17       SliceCellListEUTRA-r17
          OPTIONAL -- Need R
}
SIB2
SIB2 ::=          SEQUENCE {
Partly omitted
   cellReselectionInfoCommon     SEQUENCE {
      nrofSS-BlocksToAverage      INTEGER (2..maxNrofSS-BlocksToAverage)
OPTIONAL,      -- Need S
      absThreshSS-BlocksConsolidation   ThresholdNR       OPTIONAL,
-- Need S
      rangeToBestCell   RangeToBestCell     OPTIONAL, --
Need R
      q-Hyst      ENUMERATED {
          dB0, dB1, dB2, dB3, dB4, dB5, dB6, dB8, dB10,
          dB12, dB14, dB16, dB18, dB20, dB22, dB24},
      speedStateReselectionPars      SEQUENCE {
         mobilityStateParameters      MobilityStateParameters,
         q-HystSF         SEQUENCE {
           sf-Medium      ENUMERATED {dB-6, dB-4, dB-2, dB0},
           sf-High      ENUMERATED {dB-6, dB-4, dB-2, dB0}
         }
      }                OPTIONAL, -- Need R
...,
[[
          SliceInfoPresenceBitmap BIT STRING (SIZE (maxSlicesDefined))
sliceInfoList-R17        SEQUENCE (SIZE (1..maxSlicesConfigured)) OF SliceInfo-r17
OPTIONAL -- Need R
]]
}
SIB 4
SIB4 ::=          SEQUENCE {
   interFreqCarrierFreqList   InterFreqCarrierFreqList,
   lateNonCriticalExtension   OCTET STRING        OPTIONAL,
   ...,
   [[
   interFreqCarrierFreqList-v1610   InterFreqCarrierFreqList-v1610   OPTIONAL --
Need R
   ]]
}
InterFreqCarrierFreqList ::=   SEQUENCE (SIZE (1..maxFreq)) OF InterFreqCarrierFreqInfo
InterFreqCarrierFreqList-v1610 ::=   SEQUENCE (SIZE (1..maxFreq)) OF
InterFreqCarrierFreqInfo-v1610
InterFreqCarrierFreqInfo ::=   SEQUENCE {
Partly omitted
...,
[[
SliceInfoPresenceBitmap BIT STRING (SIZE (maxSlicesDefined))
sliceInfoList-R17      SEQUENCE (SIZE (maxSlicesDefined)) OF SliceInfo-r17
OPTIONAL -- Need R
]]
}
SIB5
SIB5 ::=          SEQUENCE {
   carrierFreqListEUTRA      CarrierFreqListEUTRA      OPTIONAL, --
Need R
   t-ReselectionEUTRA      T-Reselection,
   t-ReselectionEUTRA-SF      SpeedStateScaleFactors      OPTIONAL, --
Need S
   lateNonCriticalExtension      OCTET STRING      OPTIONAL,
   ...,
   [[
   carrierFreqListEUTRA-v1610      CarrierFreqListEUTRA-v1610      OPTIONAL
-- Need R
]]
[[
carrierFreqListEUTRA-v17xy      CarrierFreqListEUTRA-v17xy        OPTIONAL --
Need R
]]
}
CarrierFreqListEUTRA ::=      SEQUENCE (SIZE (1..maxEUTRA-Carrier)) OF
CarrierFreqEUTRA
CarrierFreqListEUTRA-v1610 ::=      SEQUENCE (SIZE (1..maxEUTRA-Carrier)) OF
```

-continued

---

Example 3 of Option 2 of Item 1 - Bitmap indicating presence of slice or slice group.

```
CarrierFreqEUTRA-v1610
CarrierFreqListEUTRA-v17xy::=      SEQUENCE (SIZE (1..maxEUTRA-Carrier)) OF
CarrierFreqEUTRA-v17xy
CarrierFreqEUTRA-v17xy ::= SEQUENCE {
SliceInfoPresenceBitmap BIT STRING (SIZE (maxSlicesDefined))
sliceInfoList-R17      SEQUENCE (SIZE (maxSlicesDefined)) OF SliceInfo-r17
OPTIONAL Need R
}
RRCRelease
RRCRelease-v17xy-IEs ::=      SEQUENCE {
        sliceSpecificCellReselectionPriorities-r17      SliceSpecificCellReselectionPriorities-
r17            OPTIONAL -- Need R
   nonCriticalExtension      SEQUENCE { }          OPTIONAL
}
SliceSpecificCellReselectionPriorities-r17 ::=  SEQUENCE {
   sliceSpecificFreqPriorityListEUTRA-r17      SliceSpecificFreqPriorityListEUTRA-17
OPTIONAL, -- Need M
   sliceSpecificFreqPriorityListNR-r17      SliceSpecificFreqPriorityListEUTRA-17
OPTIONAL, -- Need M
}
SliceSpecificFreqPriorityListEUTRA-17::=        SEQUENCE (SIZE (1..maxFreq)) OF
SliceSpecificFreqPriorityEUTRA-r17
SliceSpecificFreqPriorityListNR-r17 ::=         SEQUENCE (SIZE (1..maxFreq)) OF
SliceSpecificFreqPriorityNR-r17
SliceSpecificFreqPriorityEUTRA-r17 ::=         SEQUENCE {
   carrierFreq       ARFCN-ValueEUTRA,
SliceInfoPresenceBitmap   BIT STRING (SIZE (maxSlicesDefined))
sliceInfoList-R17        SEQUENCE (SIZE (maxSlicesDefined)) OF SliceInfo-r17
OPTIONAL -- Need R
}
FreqPriorityNR ::=      SEQUENCE {
   carrierFreq      ARFCN-ValueNR,
SliceInfoPresenceBitmap   BIT STRING (SIZE (maxSlicesDefined))
sliceInfoList-R17      SEQUENCE (SIZE (maxSlicesDefined)) OF SliceInfo-r17
OPTIONAL -- Need R
}
```

---

The slice information can be provided from network to UE via system information (e.g. SIB2/3/4/5 or a new SIB introduced for the slice information) or RRCRelease message. For the case when a new SIB is introduced for the slice information, this SIB can be configured to be area specific, i.e. the SIB is valid in an area of one of more cells.

Item 2: In the second step, UE decide the target cell for cell selection or reselection as further explained below. In some embodiments, the UE performs the operation(s) in Item 2.1 (discussed below) if a single selected element (e.g., slice or slice group or access category or frequency) is associated with a specific priority or a highest priority. In some embodiments, the UE performs the operation(s) in Item 2.1 followed by the operation(s) in Item 2.2 (discussed below) if at least two cells are associated with a same frequency or if at least two selected elements (e.g., slices or slice groups or access categories or frequencies) are associated with a same specific priority or a same highest priority.

2.1: Cell reselection priority values determination for frequencies is based on the priority value configured for each slice/slice group/access category or the number of slice/slice group/access categories associated with slices or a set of default reselection priority values.

Option 1 of Item 2.1: Select one or more slices (or slice group(s) or access category/categories) associated with one or more corresponding reselection priority values specific to the slice(s) (or slice group(s) or access category/categories). Determine the reselection priority values for frequencies associated with the selected slice. Decide or determine the target cell for cell selection or reselection based on the determined reselection priority value for the frequencies.

The slice can be selected in any one or more of the following ways:

Alternative 1: Leave to UE implementation to select a slice from the allowed S-NSSAIs/the requested S-NSSAIs/the configured S-NSSAIs with slice specific priority configured.

Alternative 2: Define a fixed rule for slice selection, e.g. select the first slice in the allowed S-NSSAIs/the requested S-NSSAIs/the configured S-NSSAIs who has slice specific reselection priority configured.

Alternative 3: Define slice priority and it is up to network (NW) to configure.

Alternative 3.1: Define slice priority and NAS/AS signaling to configure.

Alternative 3.2: Reuse the allowed S-NSSAI/the requested S-NSSAIs/the configured S-NSSAIs list and the existing signaling with an additional requirement that the S-NSSAIs will be placed in order with the first one to be the highest priority.

Alternative 4: Select the latest used slice.

Option 2 of Item 2.1: Determine the frequency priority based on the number of supported allowed S-NSSAIs/the requested S-NSSAIs/the configured S-NSSAIs and decide the target cell for cell selection or reselection following the step to determine the frequency priority.

For the frequency priority determination:

Alternative 1: UE determine the frequency priority of all the frequencies provided in system information or RRCRelease message based on the number of the intended slices (e.g., the allowed S-NSSAIs, the requested S-NSSAIs or the configured S-NSSAIs) or based on number of slice groups or based on number of access categories. For example, the frequency that supports the maximum number of slices among UE's intended slices can be determined by the UE to have the highest priority in cell reselection. The frequency that supports the second most number of slices among UE's intended slices can be determined by the UE to have the second highest priority in cell reselection, and so on. In another example, the frequency that supports the maximum number of slice groups (or maximum number of access categories) among UE's intended slices can be determined by the UE to have the highest priority in cell reselection. The frequency that supports the second most number of slice groups (or second most number of access categories) among UE's intended slices can be determined by the UE to have the second highest priority in cell reselection, and so on Alternative 2: UE only determine the highest priority frequency, e.g., the frequency that supports the maximum number of slices among UE's intended slices, and all the other frequencies will be considered as lower priority than this frequency. In another example, UE only determine the highest priority frequency, e.g., the frequency that supports the maximum number of slice groups (or maximum number of access categories) among UE's intended slices, and all the other frequencies will be considered as lower priority than this frequency.

For the case when more than one frequency supports the same number of slices among UE's intended slices, the following alternatives have been proposed:

Alternative 1: UE treat them with equal priority and the further prioritization among the frequencies which UE considers to be the same priority frequency is left to UE implementation.

Alternative 2: Further consider the existing absolute cell reselection frequency priority if provided.

Option 3 of Item 2.1: Determine the frequency priority based on the highest slice specific priority value configured for a frequency and decide the target cell for cell selection or reselection following the frequency priority.

Option 4 of Item 2.1: Determine the frequency priority based on a set of default frequency priority values for the case when the UE determines that no slice specific cell reselection priority is provided for any frequency.

Item 2.2: For cells in the same frequency or the frequencies with equal reselection priority, rank cells based on a cell ranking criterion (e.g., R-criterion) and the select the highest rank cell as the target for cell selection and reselection.

The cell-ranking criterion Rs for serving cell and Rn for neighboring cells is defined by:

$$R_s = Q_{meas,s} + Q_{hyst} - Q\text{offset}_{temp}$$

$$R_n = Q_{meas,n} - Q\text{offset} - Q\text{offset}_{temp}$$

where a description for the above variables is shown in the table below:

| | |
|---|---|
| $Q_{meas}$ | RSRP measurement quantity used in cell reselections. |
| Qoffset | For intra-frequency: Equals to $Q\text{offset}_{s,\,n}$, if $Q\text{offset}_{s,\,n}$ is valid, otherwise this equals to zero. For inter-frequency: Equals to $Q\text{offset}_{s,\,n}$ plus $Q\text{offset}_{frequency}$, if $Q\text{offset}_{s,\,n}$ is valid, otherwise this equals to $Q\text{offset}_{frequency}$. |
| $Q\text{offset}_{temp}$ | Offset temporarily applied to a cell as specified in TS 38.331. |

Alternative 1: All the cells in a certain frequency satisfying a cell selection criterion (e.g., S-criterion) will be ranked.

Alternative 2: Rank only the cells satisfying the cell selection criterion (e.g., S-criterion) in the cell list provided for slice/slice group/access category associated with slices.

The cell selection criterion S is fulfilled when:

Srxlev>0 AND Squal>0 where:

$$\text{Srxlev} = Q_{rxlevmeas} - (Q_{rxlevmin} + Q_{rxlevminoffset}) - P_{compensation} - Q\text{offset}_{temp}$$

$$\text{Squal} = Q_{qualmeas} - (Q_{qualmin} + Q_{qualminoffset}) - Q\text{offset}_{temp}$$

where:

| | |
|---|---|
| Srxlev | Cell selection RX level value (dB) |
| Squal | Cell selection quality value (dB) |
| $Q\text{offset}_{temp}$ | Offset temporarily applied to a cell as specified in TS 38.331 (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm). If the UE supports SUL frequency for this cell, $Q_{rxlevmin}$ is obtained from q-RxLevMinSUL, if present, in SIB1, SIB2 and SIB4, additionally, if $Q_{rxlevminoffsetcellSUL}$ is present in SIB3 and SIB4 for the concerned cell, this cell specific offset is added to the corresponding Qrxlevmin to achieve the required minimum RX level in the concerned cell; else $Q_{rxlevmin}$ is obtained from q-RxLevMin in SIB1, SIB2 and SIB4, additionally, if $Q_{rxlevminoffsetcell}$ is present in SIB3 and SIB4 for the concerned cell, this cell specific offset is added to the corresponding Qrxlevmin to achieve the required minimum RX level in the concerned cell. |
| $Q_{qualmin}$ | Minimum required quality level in the cell (dB). Additionally, if $Q_{qualminoffsetcell}$ is signalled for the concerned cell, this cell specific offset is added to achieve the required minimum quality level in the concerned cell. |

-continued

| | |
|---|---|
| $Q_{rxlevminoffset}$ | Offset to the signalled $Q_{rxlevmin}$ taken into account in the Srxlev evaluation as a result of a periodic search for a higher priority PLMN while camped normally in a VPLMN, as specified in TS 23.122. |
| $Q_{qualminoffset}$ | Offset to the signalled $Q_{qualmin}$ taken into account in the Squal evaluation as a result of a periodic search for a higher priority PLMN while camped normally in a VPLMN, as specified in TS 23.122. |
| $P_{compensation}$ | For FR1, if the UE supports the additionalPmax in the NR-NS-PmaxList, if present, in SIB1, SIB2 and SIB4:<br>$\max(P_{EMAX1} - P_{PowerClass}, 0) - (\min(P_{EMAX2}, P_{PowerClass}) - \min(P_{EMAX1}, P_{PowerClass}))$ (dB);<br>else:<br>$\max(P_{EMAX1} - P_{PowerClass}, 0)$ (dB)<br>For FR2, $P_{compensation}$ is set to 0. |
| $P_{EMAX1}$,<br>$P_{EMAX2}$ | Maximum TX power level of a UE may use when transmitting on the uplink in the cell (dBm) defined as $P_{EMAX}$ in TS 38.101. If UE supports SUL frequency for this cell, $P_{EMAX1}$ and $P_{EMAX2}$ are obtained from the p-Max for SUL in SIB1 and NR-NS-PmaxList for SUL respectively in SIB1, SIB2 and SIB4 as specified in TS 38.331, else $P_{EMAX1}$ and $P_{EMAX2}$ are obtained from the p-Max and NR-NS-PmaxList respectively in SIB1, SIB2 and SIB4 for normal UL as specified in TS 38.331. |
| $P_{PowerClass}$ | Maximum RF output power of the UE (dBm) according to the UE power class as defined in TS 38.101-1. |

In the implementation examples described below, the steps can be performed by a communication device (e.g., UE)

Implementation Example 1 of Option 1 of Item 2.1

Step 1: List Slices in the priority order starting with highest priority slice.

Step 2: Select the first (or next if from Step 7) slice in the list

Step 3: Assign the priorities to frequencies according to the priorities provided to the selected slice Step 4: Perform cell search according to the legacy procedure using the priorities assigned in step 3

Step 5: If the highest ranked cell is determined to be suitable then exit this sequence of operation;

Step 6: If there are remaining cell frequencies then go back to step 3

Step 7: If the end of the slice list has not been reached go back to step 2

Step 8: Perform legacy cell reselection (using non-slice-based priorities for example for frequencies not corresponding to any slice support)

Implementation Example 2 of Option 1 of Item 2.1

Step 1: Select a slice (or next if from Step 6) in the list

Step 2: Assign the priorities to frequencies according to the priorities provided to the selected slice Step 3: Perform cell search according to the legacy procedure using the priorities assigned in step 3 and only consider the cells provided in the sliceCellListNR or sliceCellListEUTRA. These cells will be ranked based on the cell ranking criterion (e.g., R-criterion).

Step 4: If the highest ranked cell is determined to be suitable then exit this sequence of operation;

Step 5: If there are remaining cell frequencies then go back to step 3

Step 6: If the end of the slice list has not been reached go back to step 2

Step 7: Perform legacy cell reselection (using non-slice-based priorities for example for frequencies not corresponding to any slice support)

Implementation Example 3 of Option 1 of Item 2.1

Step 1: Select a slice in the list

Step 3: Assign the priorities to frequencies according to the priorities provided to the selected slice Step 4: Perform cell search according to the legacy procedure using the priorities assigned in step 3.

Step 5: If the highest ranked cell is determined to be suitable then exit this sequence of operation;

Step 6: If there are remaining cell frequencies then go back to step 3

Step 7: Perform legacy cell reselection (using non-slice-based priorities for example for frequencies not corresponding to any slice support)

Implementation Example 4 of Option 1 of Item 2.1

Step 1: List Slices in the priority order starting with highest priority slice.

Step 2: Select the first slice in the list

Step 3: Assign the priorities to frequencies according to the priorities provided to the selected slice Step 4: Perform cell search according to the legacy procedure using the priorities assigned in step 3

Step 5: If the highest ranked cell is determined to be suitable and supports the selected slice in step 2 then camp on the cell and exit this sequence of operation.

Step 5-a: Else if the highest ranked cell is determined to be suitable but doesn't support the selected slice in step 2, then the priority value of this frequency is changed to the priority value of the highest priority slice supported by both UE and the highest ranked cell (e.g., intersection slice set).

Step 5-b: With updated frequency priority, if legacy inter-frequency cell reselection criteria (as illustrated below) is met, camp on the cell and exit this sequence of operation.

If priority of target frequency is higher than serving frequency, Srxlev>ThreshX, HighP during a time interval If priority of target frequency is lower than serving frequency, Srxlev<ThreshServing, LowP and Srxlev>ThreshX, LowP during a time interval Step 6: If there are remaining cell frequencies then go back to step 3

Step 7: Perform legacy cell reselection (using non-slice-based priorities for example for frequencies not corresponding to any slice support)

Implementation Example 1 of Option 2 of Item 2.1

Step 1: The UE will consider the frequency priority in cell reselection based on the number of supported slices among UE's intended slices (e.g., allowed S-NSSAIs). That is, the frequency that supports the maximum number of slices among UE's intended slices has the highest priority in cell reselection. The frequency that supports the second most slices among UE's intended slices has the second highest priority in cell reselection, and so on.
Step 2: If more than one frequency supports the same number of slices among UE's intended slices, the UE can treat them with equal priority, with the further prioritization among these frequencies decided via UE implementation.
Step 3: The UE performs the legacy cell reselection (specified in TS 38.304) following the priority assigned based on the above rules.

Implementation Example 2 of Option 2 of Item 2.1

Step 1: The UE will consider the frequency priority in cell reselection based on the number of supported slices among UE's intended slices (e.g., allowed S-NSSAIs). That is, the frequency that supports the maximum number of slices among UE's intended slices has the highest priority in cell reselection. And all the other frequencies will be considered to be with lower reselection priority than this frequency.
Step 2: If more than one frequency supports the same number of slices among UE's intended slices, the UE can treat them with equal priority, with the further prioritization among these frequencies decided via UE implementation.
Step 3: The UE performs the legacy cell reselection (specified in TS 38.304) following the priority assigned based on the above rules.

Implementation Example 3 of Option 2 of Item 2.1

Step 1: The UE will consider the frequency priority in cell reselection based on the number of supported slices among UE's intended slices (e.g., allowed S-NSSAIs). That is, the frequency that supports the maximum number of slices among UE's intended slices has the highest priority in cell reselection. And all the other frequencies will be considered to be with lower reselection priority than this frequency.
Step 2: If more than one frequency supports the same number of slices among UE's intended slices, the sub-priority among these frequencies will be determined based on the existing reselection priority (e.g., not slice specific), if provided.
Step 3: The UE performs the legacy cell reselection (specified in TS 38.304) following the priority assigned based on the above rules.

Implementation Example 1 of Option 3 of Item 2.1

Step 1: UE is provided with the list of available slices and the frequency priority corresponding to each of the available slices per frequency.

Step 2: For each frequency, the UE identifies the available slices on that frequency that are in the UE's configured slice list (e.g., the intersection of the available slices in the slice info (in the SIB or RRCRelease message) and the configured slices.)
Step 3: For each frequency, the UE assigns a frequency priority equal to the highest frequency priority to the highest frequency priority amongst those identified slices (e.g., for a frequency F1, if the identified slices are slices 1 and 2 with frequency priority of 1 and 8, assign priority 8 for that frequency).
The section below describes example techniques for indicating and using slice information:
UE receive the slice information from network side and use such slice information to decide the target cell for selection or reselection.
The slice information further compromise one of the following:
A list of slices or slice groups or access categories associated with slices supported by the serving frequency and the neighbor frequencies.
Serving frequency and a list of neighbor frequencies with the slice information provided for each frequency.
Use the slice information to decide the target cell for selection or reselection further compromise the following:
Determine the cell reselection priority for each frequency based on the priority value configured for each slice/slice group/access category associated with slices or the number of slice/slice group/access categories associated with slices
For cells in the same frequency or frequencies with equal priority, rank cells based on the R-criterion and select the highest ranked cell as the target cell for cell selection or reselection.
The cells to be ranked include all the cells in a certain frequency satisfying S-criterion or only cells in the cell list provided for slice/slice group/access category associated with slices satisfying S-criterion.
FIG. 1 shows an exemplary flowchart for indicating slice information for a cell selection operation or a cell re-selection operation. Operation 102 includes receiving, by a communication device, a slice information that indicates a configuration associated with one or more slices. Operation 104 includes performing, by the communication device, a cell selection operation or a cell re-selection operation with a target cell that is determined by the communication device using the slice information.
In some embodiments, the slice information includes a first list of one or more slice identifiers of the one or more slices, and each slice identifier in the first list is associated with one or more frequencies that support a slice. In some embodiments, the slice information includes a second list of one or more slice group identifiers, each slice group identifier in the second list is associated with one or more frequencies that support a slice group, and each slice group indicated by the second list is associated with at least one slice. In some embodiments, the slice information includes a third list of one or more access category identifiers associated with the one or more slices, and each slice identifier in the third list is associated with one or more frequencies that support an access category.
In some embodiments, the slice information includes: a serving frequency operated by the network device and one or more other frequencies associated with the network device or each of one or more other network devices. In some embodiments, the slice information includes, for the serving frequency and for each of the one or more frequencies, a first list of one or more slice identifiers of the one or more slices. In some embodiments, the slice information includes, for the serving frequency and for each of the one or more frequencies, a second list of one or more slice group identifiers, and each slice group indicated by the second list is associated with at least one slice. In some embodiments, the slice information includes, for the serving frequency and for each of the one or more frequencies, a third list of one or more access category identifiers associated with the one or more slices. In some embodiments, the slice information includes one or more reselection priority values, and each slice identifier in the first list or each slice group identifier in the second list or each access category identifier in the third list is associated with one reselection priority value for a frequency.

In some embodiments, the communication device performs the cell re-selection operation by determining a plurality of reselection priority values of a plurality of frequencies and by determining the target cell associated with one frequency from the plurality of frequencies. In some embodiments, the plurality of reselection priority values of the plurality of frequencies is determined according to a set of reselection priority values associated with the one or more slices, or one or more slice groups, or the one or more access categories. In some embodiments, the plurality of reselection priority values of the plurality of frequency is determined according to a number of the one or more slices, or a number of the one or more slice groups, or a number of the one or more access categories supported in each frequency. In some embodiments, the communication device performs the cell selection operation or the cell re-selection operation by determining that the target cell is a highest ranked cell from a plurality of cells. In some embodiments, the communication device ranks the plurality of cells in an order based on a cell ranking criterion upon determining that the plurality of cells are associated with a same frequency.

In some embodiments, the communication device ranks the plurality of cells in an order based on a cell ranking criterion upon determining that one frequency from one cell from the plurality of cells is associated with a same reselection priority value as another frequency from another cell from the plurality of cells. In some embodiments, the plurality of cells are associated with at least one frequency that satisfies a cell selection criterion. In some embodiments, the plurality of cells are from a fourth list of cells indicated in the slice information, and the plurality of cells satisfy a cell selection criterion.

FIG. 2A shows an exemplary flowchart for indicating slice information. Operation 202 includes transmitting, by a network device to a communication device, a slice information that indicates a configuration associated with one or more slices, where the slice information includes a first list of one or more slice identifiers of the one or more slices, and where each slice identifier in the first list is associated with one or more frequencies that support a slice.

Figure 2B:
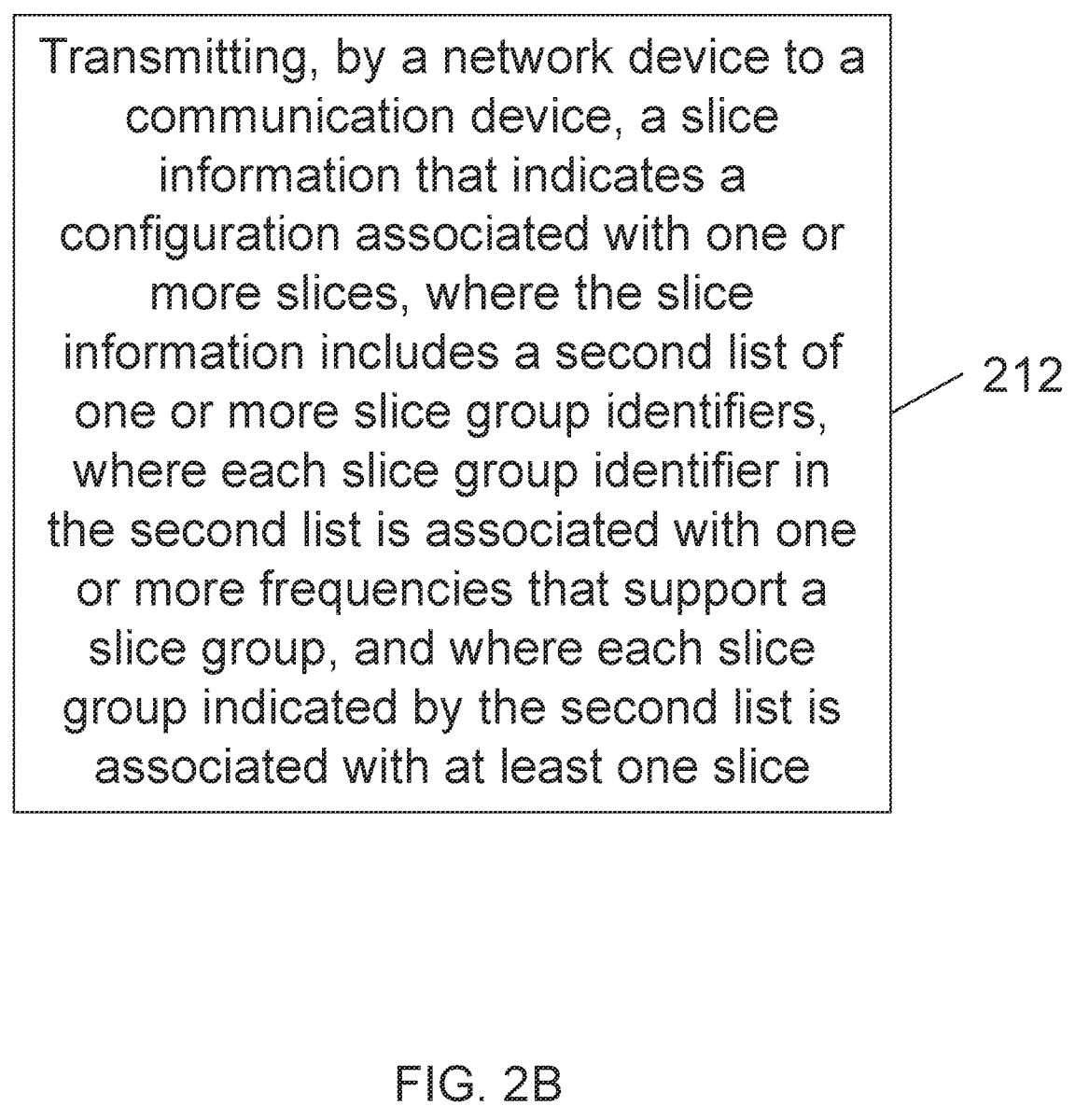

FIG. 2B shows an exemplary flowchart for indicating slice information. Operation 212 includes transmitting, by a network device to a communication device, a slice information that indicates a configuration associated with one or more slices, where the slice information includes a second list of one or more slice group identifiers, where each slice group identifier in the second list is associated with one or more frequencies that support a slice group, and where each slice group indicated by the second list is associated with at least one slice.

Figure 2C:
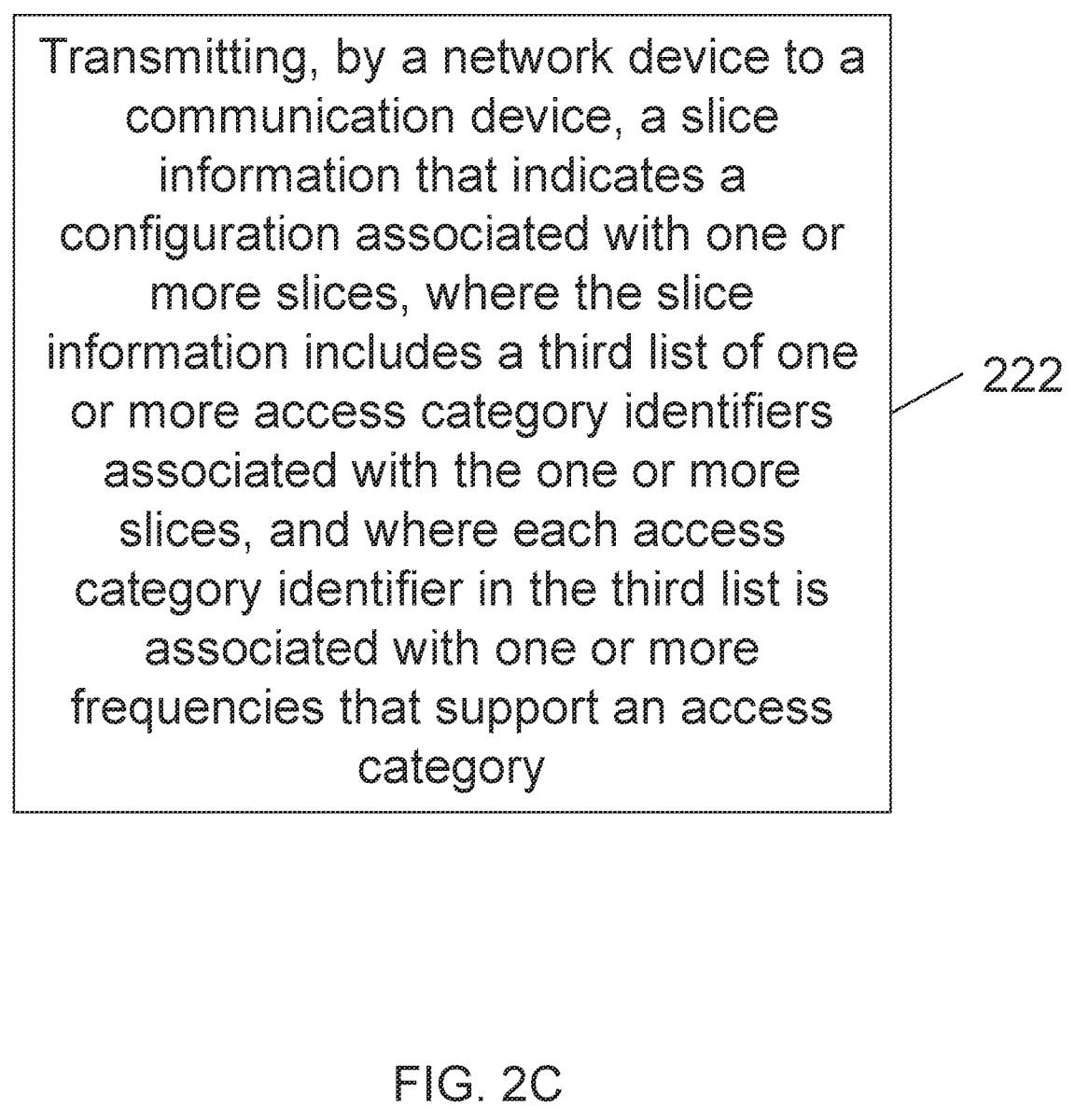

FIG. 2C shows an exemplary flowchart for indicating slice information. Operation 222 includes transmitting, by a network device to a communication device, a slice information that indicates a configuration associated with one or more slices, where the slice information includes a third list of one or more access category identifiers associated with the one or more slices, and where each access category identifier in the third list is associated with one or more frequencies that support an access category.

Figure 3:
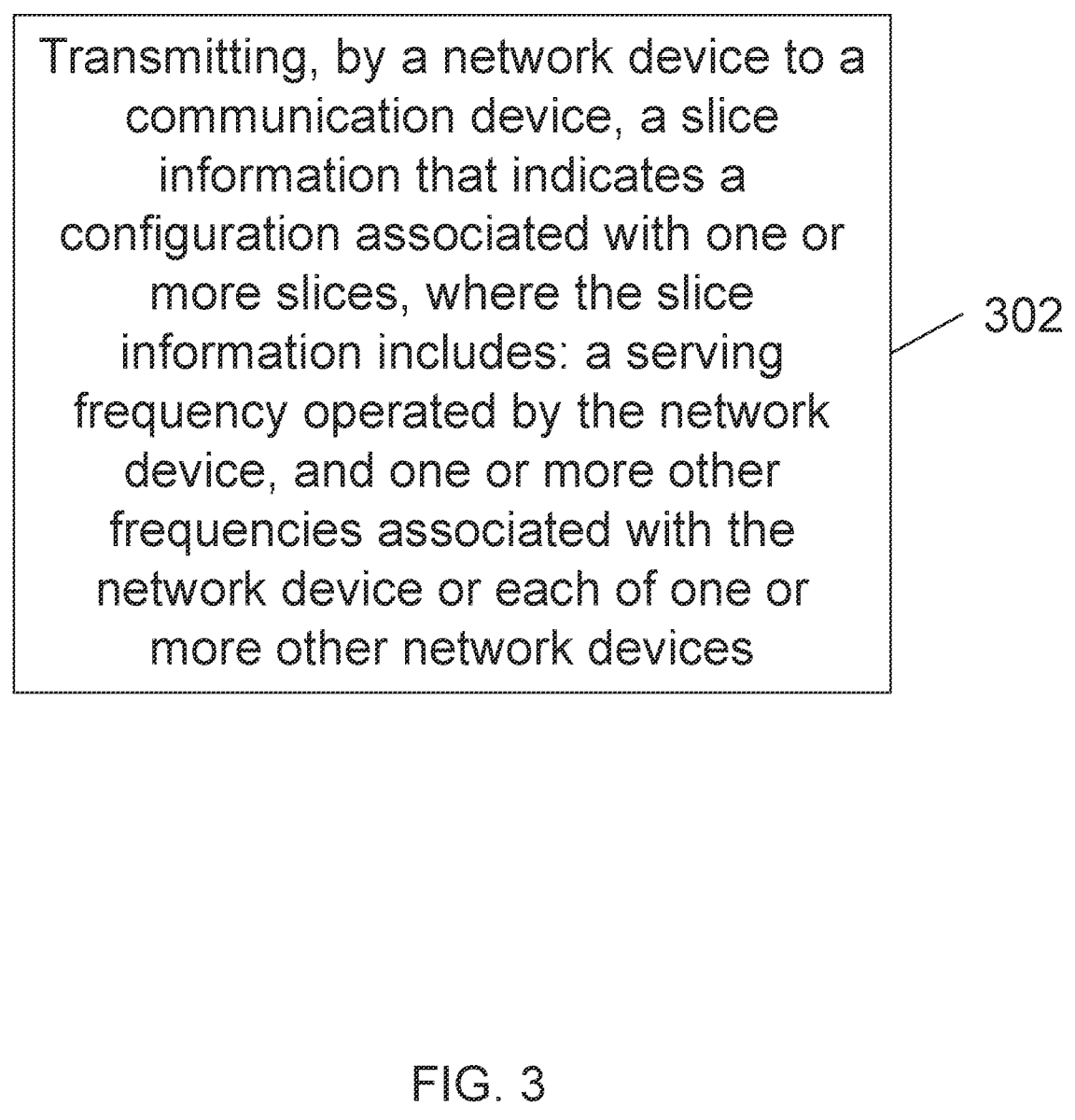

FIG. 3 shows an exemplary flowchart for indicating slice information. Operation 302 includes transmitting, by a network device to a communication device, a slice information that indicates a configuration associated with one or more slices, where the slice information includes: a serving frequency operated by the network device, and one or more other frequencies associated with the network device or each of one or more other network devices.

In some embodiments, the slice information includes, for the serving frequency and for each of the one or more frequencies, a first list of one or more slice identifiers of the one or more slices. In some embodiments, the slice information includes, for the serving frequency and for each of the one or more frequencies, a second list of one or more slice group identifiers, and each slice group indicated by the second list is associated with at least one slice. In some embodiments, the slice information includes, for the serving frequency and for each of the one or more frequencies, a third list of one or more access category identifiers associated with the one or more slices. In some embodiments, the slice information includes one or more reselection priority values, and each slice identifier in the first list or each slice group identifier in the second list or each access category identifier in the third list is associated with one reselection priority value for a frequency.

Figure 4:
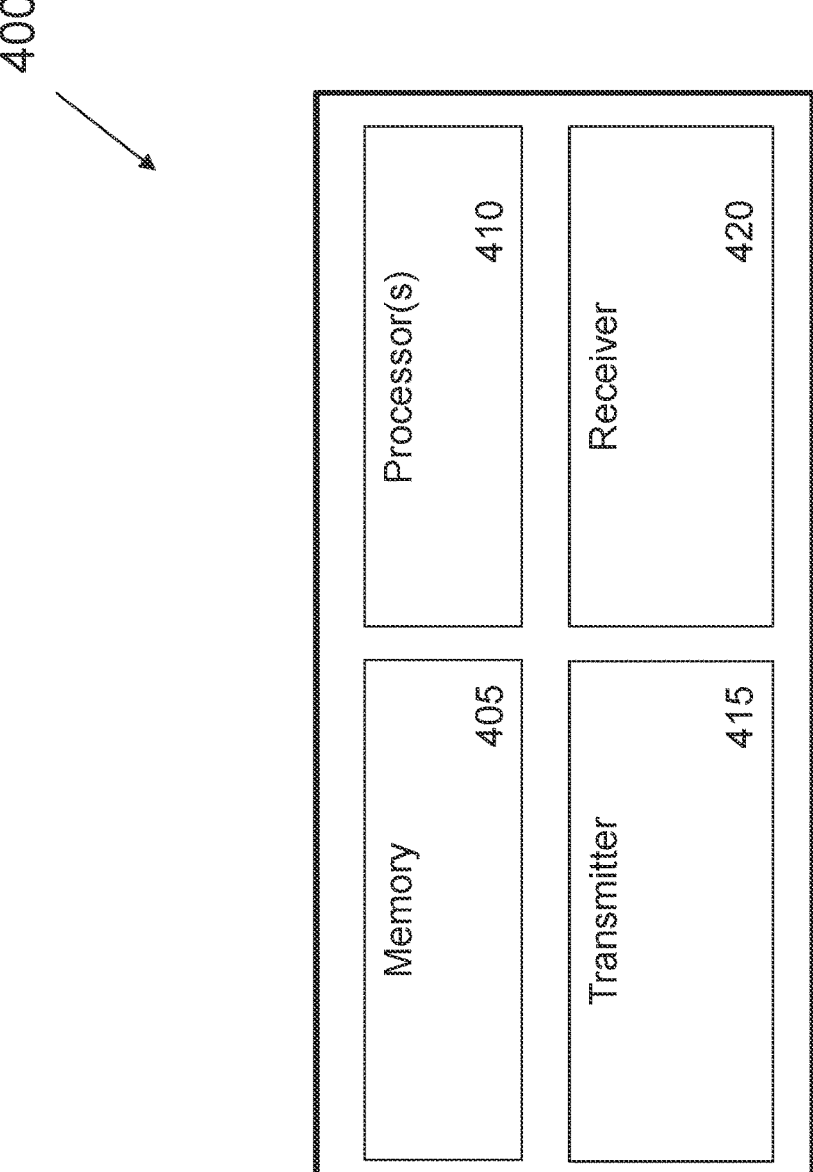
FIG. 4 shows an exemplary block diagram of a hardware platform that may be a part of a network device or a communication device.

FIG. 4 shows an exemplary block diagram of a hardware platform 400 that may be a part of a network device (e.g., base station) or a communication device (e.g., a user equipment (UE)). The hardware platform 400 includes at least one processor 410 and a memory 405 having instructions stored thereupon. The instructions upon execution by the processor 410 configure the hardware platform 400 to perform the operations described in FIGS. 1 to 3 and in the various embodiments described in this patent document. The transmitter 415 transmits or sends information or data to another device. For example, a network device transmitter can send a message to a user equipment. The receiver 420 receives information or data transmitted or sent by another device. For example, a user equipment can receive a message from a network device.

Figure 5:
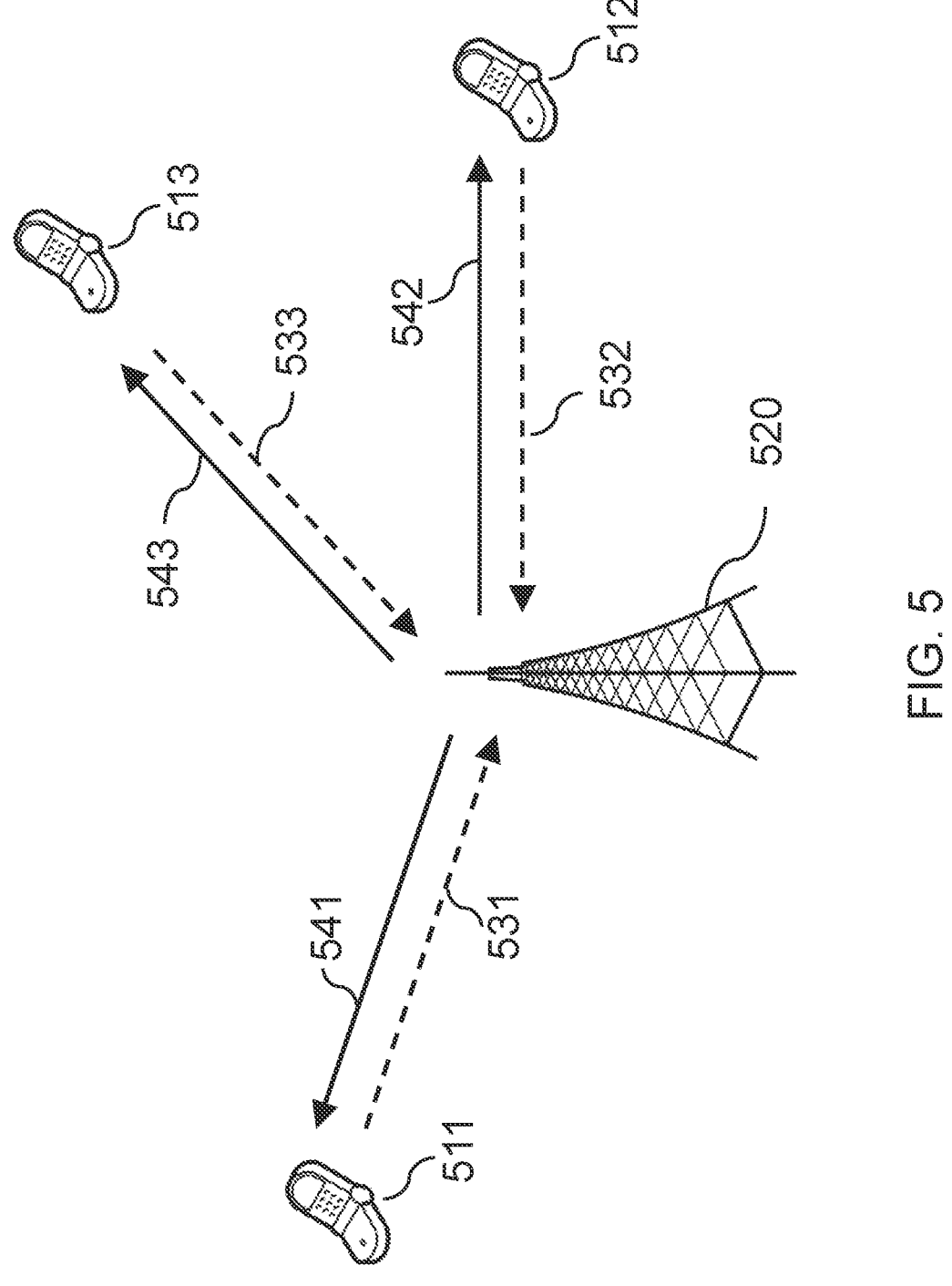
FIG. 5 shows an example of wireless communication including a base station (BS) and user equipment (UE) based on some implementations of the disclosed technology.

The implementations as discussed above will apply to a wireless communication. FIG. 5 shows an example of a wireless communication system (e.g., a 5G or NR cellular network) that includes a base station 520 and one or more user equipment (UE) 511, 512 and 513. In some embodiments, the UEs access the BS (e.g., the network) using a communication link to the network (sometimes called uplink direction, as depicted by dashed arrows 531, 532, 533), which then enables subsequent communication (e.g., shown in the direction from the network to the UEs, sometimes called downlink direction, shown by arrows 541, 542, 543) from the BS to the UEs. In some embodiments, the BS send information to the UEs (sometimes called downlink direction, as depicted by arrows 541, 542, 543), which then enables subsequent communication (e.g., shown in the direction from the UEs to the BS, sometimes called uplink direction, shown by dashed arrows 531, 532, 533) from the UEs to the BS. The UE may be, for example, a smartphone, a tablet, a mobile computer, a machine to machine (M2M) device, an Internet of Things (IOT) device, and so on.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:

receiving, by a communication device, a slice information that indicates a configuration associated with one or more slices; and performing, by the communication device, a cell re-selection operation with a target cell that is determined by the communication device using the slice information, wherein the slice information includes:

a first frequency operated by a first network device as a serving frequency;

one or more second frequencies associated with at least one of the first network device or one or more second network devices;

a list of one or more slice group identifiers for the first frequency and each of the one or more second frequencies, wherein each slice group indicated by the list of one or more slice group identifiers is associated with at least one slice; and one or more reselection priority values, wherein each slice group identifier in the list of one or more slice group identifiers is associated with one reselection priority value for a frequency, wherein the performing the cell re-selection operation includes:

determining, based on the slice information, one or more reselection priority values associated with slice groups indicated by the slice information;

identifying frequencies and cells associated with a slice group having a highest reselection priority value among the slice groups; and ranking, within the identified frequencies and cells, a plurality of cells based on a cell ranking criterion, and determining the target cell as a highest ranked cell among the ranked plurality of cells.

2. The method of claim 1, wherein the performing the cell re-selection operation includes: determining a plurality of reselection priority values of a plurality of frequencies; and determining, as the target cell, a cell that is associated with one frequency of the plurality of frequencies.

3. The method of claim 2, wherein the plurality of reselection priority values of the plurality of frequencies is determined according to a set of reselection priority values associated with one or more slice groups.

4. The method of claim 1, wherein the communication device ranks the plurality of cells in an order based on the cell ranking criterion upon determining that the plurality of cells are associated with a same frequency.

5. The method of claim 1, wherein the communication device ranks the plurality of cells in an order based on the cell ranking criterion upon determining that one frequency from one cell out of the plurality of cells is associated with a same reselection priority value as another frequency from another cell out of the plurality of cells.

6. The method of claim 1, wherein the plurality of cells are associated with at least one frequency that satisfies a cell selection criterion.

7. The method of claim 1, wherein the slice information include a list of slice groups associated with slices supported by each frequency, and one or more of a reselection priority value or a list of cells identified by physical cell identity (PCI) included in each slice group.

8. The method of claim 1, wherein the one or more slice group identifiers are indicated using at least one of: radio resource control (RRC) release; slice specific frequency priority list; frequency priority; carrier frequency; absolute radio frequency channel number (ARFCN); slice information; slice identity; cell reselection priority; or cell reselection subpriority.

9. The method of claim 1, wherein a slice is selected based on slice priority and non-access stratum (NAS) signaling to configure.

10. A wireless communication method, comprising:

transmitting, by a first network device to a communication device, a slice information that indicates a configuration associated with one or more slices, wherein the slice information includes:

a first frequency operated by the network device as a serving frequency;

one or more second frequencies associated with at least one of the first network device or one or more second network devices;

a list of one or more slice group identifiers for the first frequency and each of the one or more second frequencies, wherein each slice group indicated by the list of one or more slice group identifiers is associated with at least one slice; and one or more reselection priority values, wherein each slice group identifier in the list of one or more slice group identifiers is associated with one reselection priority value for a frequency, wherein a cell re-selection operation is performed by determining that a target cell is a highest ranked cell from a plurality of cells, wherein the cell re-selection operation includes:

determining, based on the slice information, one or more reselection priority values associated with slice groups indicated by the slice information;

identifying frequencies and cells associated with a slice group having a highest reselection priority value among the slice groups; and ranking, within the identified frequencies and cells, a plurality of cells based on a cell ranking criterion, and determining the target cell as a highest ranked cell among the ranked plurality of cells.

11. The method of claim 10, wherein the plurality of cells is ranked in an order based on the cell ranking criterion upon determining that the plurality of cells is associated with a same frequency.

12. The method of claim 10, wherein the plurality of cells is ranked in an order based on the cell ranking criterion upon determining that one frequency from one cell out of the plurality of cells is associated with a same reselection priority value as another frequency from another cell out of the plurality of cells.

13. The method of claim 10, wherein the plurality of cells is associated with at least one frequency that satisfies a cell selection criterion.

14. A wireless communication method, comprising:

receiving, by a communication device, a slice information that indicates a configuration associated with one or more slices; and performing, by the communication device, a cell re-selection operation with a target cell that is determined by the communication device using the slice information, wherein the slice information includes:

a first frequency operated by a first network device as a serving frequency;

one or more second frequencies associated with at least one of the first network device or one or more second network devices;

a list of one or more slice group identifiers for the first frequency and each of the one or more second frequencies, wherein each slice group indicated by the list of one or more slice group identifiers is associated with at least one slice; and one or more reselection priority values, wherein each slice group identifier in the list of one or more slice group identifiers is associated with one reselection priority value for a frequency, wherein the slice information is indicated using a frequency information list that includes: a first item that refers to the serving frequency; a second item that refers to a first frequency in an inter-frequency carrier frequency list in system information block type 4 (SIB4) and a third item that refers to a second frequency in the inter-frequency carrier frequency list in SIB4.

15. A communication device for wireless communication comprising at least one processor, configured to cause the communication device to implement a method, comprising:

receiving a slice information that indicates a configuration associated with one or more slices; and performing a cell re-selection operation with a target cell that is determined by the communication device using the slice information, wherein the slice information includes:

a first frequency operated by a first network device as a serving frequency;

one or more second frequencies associated with at least one of the first network device or one or more second network devices;

a list of one or more slice group identifiers for the first frequency and each of the one or more second frequencies, wherein each slice group indicated by the list of one or more slice group identifiers is associated with at least one slice; and one or more reselection priority values, wherein each slice group identifier in the list of one or more slice group identifiers is associated with one reselection priority value for a frequency, wherein the performing the cell re-selection operation includes:

determining, based on the slice information, one or more reselection priority values associated with slice groups indicated by the slice information;

identifying frequencies and cells associated with a slice group having a highest reselection priority value among the slice groups; and ranking, within the identified frequencies and cells, a plurality of cells based on a cell ranking criterion, and determining the target cell as a highest ranked cell among the ranked plurality of cells.

16. The communication device of claim 15, wherein the performing the cell re-selection operation includes: determining a plurality of reselection priority values of a plurality of frequencies; and determining, as the target cell, a cell that is associated with one frequency of the plurality of frequencies.

17. The communication device of claim 16, wherein the plurality of reselection priority values of the plurality of frequencies is determined according to a set of reselection priority values associated with one or more slice groups.

18. The communication device of claim 15, wherein the communication device ranks the plurality of cells in an order based on the cell ranking criterion upon determining that the plurality of cells are associated with a same frequency.

19. The communication device of claim 15, wherein the communication device ranks the plurality of cells in an order based on the cell ranking criterion upon determining that one frequency from one cell out of the plurality of cells is associated with a same reselection priority value as another frequency from another cell out of the plurality of cells.

20. The communication device of claim 15, wherein the plurality of cells are associated with at least one frequency that satisfies a cell selection criterion.

21. The communication device of claim 15, wherein the slice information include a list of slice groups associated with slices supported by each frequency, and one or more of a reselection priority value or a list of cells identified by physical cell identity (PCI) included in each slice group.

22. The communication device of claim 15, wherein the one or more slice group identifiers are indicated using at least one of: radio resource control (RRC) release; slice specific frequency priority list; frequency priority; carrier frequency; absolute radio frequency channel number (ARFCN); slice information; slice identity; cell reselection priority; or cell reselection subpriority.

23. The communication device of claim 15, wherein a slice is selected based on slice priority and non-access stratum (NAS) signaling to configure.

24. A communication device for wireless communication comprising at least one processor, configured to cause the communication device to implement a method, comprising:
receiving a slice information that indicates a configuration associated with one or more slices; and
performing a cell re-selection operation with a target cell that is determined by the communication device using the slice information,
wherein the slice information includes:
a first frequency operated by a first network device as a serving frequency;
one or more second frequencies associated with at least one of the first network device or one or more second network devices;
a list of one or more slice group identifiers for the first frequency and each of the one or more second frequencies, wherein each slice group indicated by the list of one or more slice group identifiers is associated with at least one slice; and
one or more reselection priority values, wherein each slice group identifier in the list of one or more slice group identifiers is associated with one reselection priority value for a frequency, wherein the slice information is indicated using a frequency information list that includes: a first item that refers to the serving frequency; a second item that refers to a first frequency in an inter-frequency carrier frequency list in system information block type 4 (SIB4) and a third item that refers to a second frequency in the inter-frequency carrier frequency list in SIB4.

25. A first network device for wireless communication comprising at least one processor, configured to implement a method, comprising:
transmitting, to a communication device, a slice information that indicates a configuration associated with one or more slices,
wherein the slice information includes:
a first frequency operated by the network device as a serving frequency;
one or more second frequencies associated with at least one of the first network device or one or more second network devices;
a list of one or more slice group identifiers for the first frequency and each of the one or more second frequencies, wherein each slice group indicated by the list of one or more slice group identifiers is associated with at least one slice; and
one or more reselection priority values, wherein each slice group identifier in the list of one or more slice group identifiers is associated with one reselection priority value for a frequency,
wherein a cell re-selection operation is performed by determining that a target cell is a highest ranked cell from a plurality of cells,
wherein the cell re-selection operation includes:
determining, based on the slice information, one or more reselection priority values associated with slice groups indicated by the slice information;
identifying frequencies and cells associated with a slice group having a highest reselection priority value among the slice groups; and
ranking, within the identified frequencies and cells, a plurality of cells based on a cell ranking criterion, and determining the target cell as a highest ranked cell among the ranked plurality of cells.

26. The network device of claim 25, wherein the plurality of cells is ranked in an order based on the cell ranking criterion upon determining that the plurality of cells is associated with a same frequency.

27. The network device of claim 25, wherein the plurality of cells is ranked in an order based on the cell ranking criterion upon determining that one frequency from one cell out of the plurality of cells is associated with a same reselection priority value as another frequency from another cell out of the plurality of cells.

28. The network device of claim 25, wherein the plurality of cells is associated with at least one frequency that satisfies a cell selection criterion.

* * * * *